United States Patent
Baumgart et al.

(10) Patent No.: US 11,079,668 B1
(45) Date of Patent: Aug. 3, 2021

(54) REFLECTIVE DISPLAY

(71) Applicant: MirraViz, Inc., Fremont, CA (US)

(72) Inventors: Peter M. Baumgart, Pleasanton, CA (US); Stephen Christopher Kekoa Hager, Hayward, CA (US); Ye Yuan, Fremont, CA (US); Michael Wang, Sunnyvale, CA (US)

(73) Assignee: MirraViz, Inc., Fremont, CA (US)

( * ) Notice: Subject to any disclaimer, the term of this patent is extended or adjusted under 35 U.S.C. 154(b) by 0 days.

(21) Appl. No.: 17/136,848

(22) Filed: Dec. 29, 2020

Related U.S. Application Data

(60) Provisional application No. 63/048,898, filed on Jul. 7, 2020.

(51) Int. Cl.
| | |
|---|---|
| *G03B 21/60* | (2014.01) |
| *G02B 3/08* | (2006.01) |
| *G02B 5/09* | (2006.01) |
| *G03B 21/58* | (2014.01) |
| *G03B 21/56* | (2006.01) |
| *G03B 21/62* | (2014.01) |
| *G03B 21/10* | (2006.01) |

(52) U.S. Cl.
CPC .......... *G03B 21/60* (2013.01); *G02B 3/08* (2013.01); *G02B 5/09* (2013.01); *G03B 21/10* (2013.01); *G03B 21/56* (2013.01); *G03B 21/58* (2013.01); *G03B 21/62* (2013.01)

(58) Field of Classification Search
CPC ........ G03B 21/56; G03B 21/60; G03B 21/10; G03B 21/58; G03B 21/62
USPC .......................................................... 359/449
See application file for complete search history.

(56) References Cited

U.S. PATENT DOCUMENTS

| | | | |
|---|---|---|---|
| 5,837,346 A | * 11/1998 | Langille | G02B 5/0284 |
| | | | 428/141 |
| 7,113,333 B2 | * 9/2006 | Kamijima | G02B 3/0012 |
| | | | 348/210.99 |
| 9,039,196 B2 | 3/2015 | Hirakawa et al. | |
| 9,689,551 B2 | 6/2017 | Fidler et al. | |
| 9,838,655 B2 | 12/2017 | Kato | |
| 10,429,727 B2 | 10/2019 | Dawson et al. | |

(Continued)

FOREIGN PATENT DOCUMENTS

| | | |
|---|---|---|
| WO | WO 2019/040484 A1 | 2/2019 |
| WO | WO 2020/056038 A1 | 3/2020 |

OTHER PUBLICATIONS

CinemaSource, Types of Home Theater Projection Screens, www.cinemasource.com, 2002, 15 pages (Year: 2002).*

(Continued)

*Primary Examiner* — Clayton E. LaBalle
*Assistant Examiner* — Kevin C Butler
(74) *Attorney, Agent, or Firm* — Knobbe, Martens, Olson & Bear, LLP

(57) ABSTRACT

The disclosed technology relates generally to reflective displays, and more particularly to reflective displays configured to display images with customized and improved viewing parameters. In one aspect, a reflective display comprises a plurality of light-reflective microfacets configured to display an image by reflecting light incident thereon from a light source, wherein light rays reflected by different ones of the microfacets are directed in non-parallel directions.

27 Claims, 22 Drawing Sheets

(56) References Cited

U.S. PATENT DOCUMENTS

| | | | | |
|---|---|---|---|---|
| 2004/0160669 A1* | 8/2004 | Osawa | ............... | G03B 21/625 |
| | | | | 359/460 |
| 2005/0248843 A1* | 11/2005 | Maruta | ............... | G03B 21/602 |
| | | | | 359/459 |
| 2007/0035827 A1* | 2/2007 | Shimoda | ............. | G03B 21/602 |
| | | | | 359/449 |
| 2009/0190210 A1* | 7/2009 | Coleman | ............... | G02B 30/25 |
| | | | | 359/452 |
| 2016/0334697 A1* | 11/2016 | Kim | ..................... | G02B 5/0242 |
| 2018/0348411 A1* | 12/2018 | Yamaki | .................. | G03B 21/14 |
| 2019/0235375 A1 | 8/2019 | Martinez | | |
| 2019/0354002 A1* | 11/2019 | Hu | ..................... | G03B 21/625 |

OTHER PUBLICATIONS

Dennis F. Vanderwerf, Applied Prismatic and Reflective Optics, https://doi.org/10.1117/3.867634.ch9, SPIE Digital Library, 2010, 47 pages (Year: 2010).* https://www.youtube.com/watch?v=3M0llW6oows, content uploaded on May 25, 2017.

Oshiro et al., "Perception of Motion-Adaptive Color Images Displayed by a High-Speed Dmd Projector", 26th IEEE Conference on Virtual Reality and 3D User Interfaces, VR 2019—Proceedings, Institute of Electrical and Electronics Engineers Inc., pp. 1790-1793, Mar. 2019.

Piovarci et al., "Design and Analysis of Directional Front Projection Screens", Elsevier, Computers & Graphics (2018), pp. 1-14.

* cited by examiner

US 11,079,668 B1

REFLECTIVE DISPLAY

INCORPORATION BY REFERENCE TO ANY PRIORITY APPLICATIONS

Any and all applications for which a priority claim is identified in the Application Data Sheet as filed with the present application are hereby incorporated by reference under 37 CFR 1.57.

This application claims priority benefit under 35 U.S.C. § 119(e) to U.S. Provisional Patent Application Ser. No. 63/048,898, filed Jul. 7, 2020 and entitled "REFLECTIVE PROJECTOR DISPLAY," the content of which is hereby expressly incorporated by reference in its entirety.

BACKGROUND

Field

The disclosed technology relates generally to displays, and more particularly to reflective displays configured to provide improved viewing parameters.

Description of the Related Technology

Reflective display systems can offer various advantages compared to light emission-based display systems. For example, because the image is projected from a projector at a distance, reflective display systems can offer customizable image sizes. In addition, because projected images can be relatively large (e.g., >100 inches) and can be viewed from a relatively longer distance relative to light emission-based display systems, reflective display systems can provide higher eye comfort. Furthermore, because projectors are relatively compact and can be deployed at different locations, reflective display systems can be more portable, offer more subtle presence and can allow for more efficient utilization of the surrounding space in which they are used. Finally, reflective display systems can provide, for comparable sizes and image qualities, relatively low-cost solutions compared to light emission-based displays. Owing to these and other advantages, there is an increasing need to improve various aspects of reflective display systems, including the brightness, contrast and flexibility in positioning of the projector.

SUMMARY

In one aspect, a reflective display comprises a plurality of light-reflective microfacets formed on a major surface thereof and configured to display an image by reflecting light incident thereon from a light source. Light rays reflected by different ones of the microfacets are directed in non-parallel directions.

In another aspect, a reflective display comprises a plurality of light-reflective microfacets formed on a major surface thereof and configured to display an image by reflecting light incident thereon from a light source. The microfacets have a distribution of microfacet orientations such that an intensity profile of light crossing a viewing window in one or both of a horizontal direction and a vertical direction is substantially non-Gaussian. The viewing window defining an area in a viewing plane parallel to the major surface at a viewing distance therefrom.

In another aspect, a reflective display comprises a major surface having formed thereon a plurality of light-reflective microfacets configured to display an image by reflecting light incident thereon from a light source. The microfacets are arranged to form a plurality of pixels, wherein different ones of the microfacets within at least some of the pixels are configured to reflect light rays to cross unique ones of non-overlapping regions of a viewing window. The viewing window defining an area in a viewing plane parallel to the major surface at a viewing distance therefrom.

BRIEF DESCRIPTION OF THE DRAWINGS

The novel features of the invention are set forth with particularity. A better understanding of the features and advantages of the present invention will be obtained by reference to the following detailed description that sets forth illustrative embodiments, in which the principles of the invention are utilized, and the accompanying drawings (also "figure" and "FIG." herein), of which.

DETAILED DESCRIPTION

Figure 1:
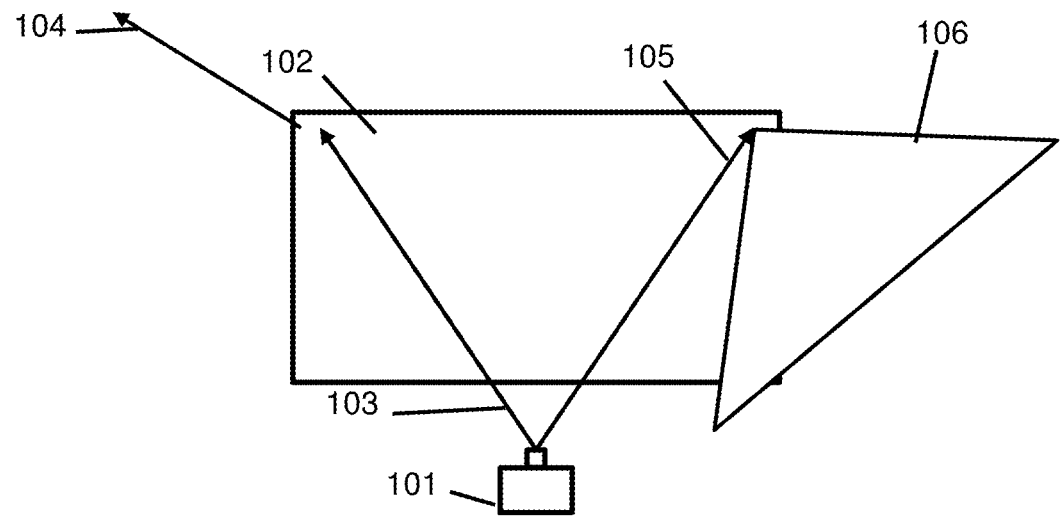
FIG. 1 illustrates an example reflective display system including an ultra-short throw (UST) projector, projecting light onto a reflective display.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings, equations and description are to be regarded as illustrative in nature, and not as restrictive.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

As described above, reflective display systems can offer various advantages. However, a number of challenges continue to limit the utility, effectiveness and widespread usage of some reflective display systems. One limitation of some reflective display systems is associated with the brightness of the image reflected off the screen's surface. In reflective display systems, a significant portion of the light is reflected (for front-projection systems) or transmitted (for rear-projection systems) to locations where there are no viewers. For example, for front projection-based reflective display systems, a prevalent screen type is a basic white fabric-based screen which diffuses light broadly in all directions. As a result, undesirably, a large portion of projected light is reflected or scattered off in directions where there are no viewers. A gain value, which is used in the industry and herein as a measure of brightness of an image that is reflected back from a screen surface, for typical front projection display screens is around 0.9 to 1.1, where a gain value of 1.0 represents a calibrated brightness measurement using a white mica block.

Another limitation associated with some reflective display systems is associated with limited contrast due to ambient light. For example, some conventional fabric-based reflective displays have a relatively low contrast ratio because the screen surface is white and scatters light over a broad range of angles, which results in a significant amount of ambient light reflecting and scattering into users' eyes. To mitigate such effect, some reflective displays utilize ambient light rejecting (ALR) properties to improve contrast ratio performance. These reflective displays can reduce the amount of ambient light that is reflected to viewers' eyes, thereby improving contrast ratio. However, the gain value for these types of reflective displays is thereby reduced, with typical values being less than approximately 1.5 for gain at a peak viewing location and often dropping to a gain of less than 1.0, as viewers move away from the peak viewing location.

Another limitation is associated with a relatively large unobstructed line of sight distance between the projector and the reflective display that may be required for some traditional reflective display systems, which can in turn involve complicated mounting procedures. For example, for a 100-inch screen, permanently installed traditional projectors will likely utilize a ceiling mount placed at least 10 feet from the screen if not greater, which provides the desired throw distance (depending on the projector) and a clean line of unobstructed sight that prevents viewers from casting shadows on the image every time they cross the projected light. Some projectors, called ultra-short throw (UST) projectors, have significantly smaller throw-ratios than traditional long-throw (LT) projectors. As used in the industry and herein, a throw ratio refers to a ratio of the distance between the projector lens and the screen surface (also referred to as a throw distance) and the width of the screen. A projector or a reflective display is considered to be configured for UST if it is configured for a throw ratio of less than about 0.4, for instance 0.15-0.30, configured for short throw (ST) if it is configured for a throw ratio between about 0.4 and 1.0, and configured for LT if it is configured for a throw ratio of >1.0. Some UST reflective displays utilize radial Fresnel optics or louvered surface topography to help direct the light and/or reduce the reflection of ambient light reflected back to viewers. However, these reflective displays still reflect a significant portion of incident light into locations that are unlikely to be occupied by viewers. As a result, the gain values for these screens are typically in the range of ~0.75×-1.5×, which is comparable to conventional fabric projection screens. An additional limitation of current UST reflective displays is that the brightness or gain can have a Gaussian-like profile with high brightness near the center of the viewing window and significantly reduced away from the center of the viewing window.

To address the above-mentioned limitations of existing reflective displays and systems, the present disclosure provides displays, display systems and display methods based on a microfacet-based reflective display to engineer and optimize the displayed image. Various embodiments are directed to a microfacet-based reflective display comprising a plurality of light-reflective microfacets formed on a major surface thereof and configured to display an image by collectively reflecting light incident thereon from a light source such as a projector. The embodiments are optically engineered to optimize one or more of the shape, intensity profile and direction of light reflected from the microfacet-based reflective display such that various viewing parameters such as brightness, uniformity, viewing window, contrast, and ambient light glare reduction can be improved and adapted for a particular purpose or setting.

The present disclosure provides systems and methods for reflective displays that address various limitations of reflective display systems that are currently available. In particular, to address the unmet needs described above as well as various other unmet needs of microfacet-based reflective display systems, disclosed herein is a microfacet-based reflective display system based on reflective microfacets for LT, ST and UST reflective displays that can provide both high gain with good ALR properties. The reflective display includes a combination of various media or layers, sometimes including a reflective medium or a layer and one or more optically functional media or layer(s). As an alternative to conventional display screens, some display systems use an optical layer with an array of reflective optical elements with engineered optical properties, which can be combined with a light shape optical modulation layer or diffusive layer to enable a significant brightness increase, as well as ALR capabilities. This approach has been demonstrated to achieve significant screen gain performance improvement as well as unique viewing window characteristics for improved user experience. Embodiments disclosed herein provide this and other technical advantages. The embodiments provide, without limitation, the following technical advantages.

The embodiments provide microfacet-based reflective displays having microfacets that are engineered such that the shape of the reflected light profile within a viewing window can be customized for a particular viewing purpose. The display systems utilize various aspects of engineered reflective microfacets including their orientations in order to control and customize metrics that define the properties of displayed images. Using an array of precisely oriented facets, the properties of displayed images can be controlled to a degree that may not be achievable using conventional reflective displays. One advantage of the microfacet-based reflective display according to embodiments is that they can generate engineered light profiles having shapes that are different from typical distributions of light achievable using conventional reflective displays, e.g., Gaussian-like or Lambertian-like distribution. For example, a light profile having a relatively flat plateau-like shape can be achieved. In addition, engineered light profiles having relatively sharp viewing window cutoffs can be achieved, which in turn increases the amount of light available for viewing by viewers. The viewing window may correspond to locations of viewers, such that the amount of light directed to non-viewing locations can be reduced.

The embodiments additionally provide microfacet-based reflective displays having microfacets that are engineered such that the reflected light profile within a viewing window can have high uniformity and reduced artifacts. The display systems utilize various aspects of engineered reflective microfacets including their orientations to enable reduction or elimination of artefacts such as unevenness or graininess of observed images. By algorithmically determining the orientations of the reflective microfacets, the graininess and/or repeating block patterns that may otherwise be visible can be systematically reduced or eliminated. For example, the high uniformity and reduced artifacts can be achieved by preventing random or systematic overlapping of reflected light rays crossing a viewing window from different microfacets. They can also be achieved by preventing repeating blocks within the screen and locally randomizing the viewing window coverage while maintaining an overall even viewing window coverage over the entire viewing window.

The embodiments additionally provide algorithms to engineer the distribution of reflective microfacets in order to change the viewing window size or shape as a function of location on the screen as well as to change the profile or distribution of the viewing window in order to compensate for process interactions that may cause the viewing window to otherwise be non-ideal. This may be done at the macroscopic level or it may also be done at the microscopic level. For example, tiling adjacent screen sections during manufacturing can result in visual artifacts within the viewing window arising from interfaces between adjacent screen sections. Such effects may be compensated during the design phase for that particular population of microfacets. In another example, designing sub-viewing windows corresponding to different locations of the reflective display to be different compensates for location-dependent different viewing window shifts.

The embodiments additionally provide methods for manufacturing microfacet-based reflective displays having engineered microfacets. Manufacturing of dense arrays of precisely engineered microfacets with unique orientations for different locations on the screen can be time consuming and costly. The inventors have discovered that fabricating tiles having the microfacets and assembling the tiles into a microfacet-based reflective display can enable cost-effective manufacturing thereof. The tiles in turn be fabricated from sub-tiles. By reusing at least some sub-tiles having arrays of microfacets, cost and time of manufacturing can be significantly reduced while still maintaining the desired viewing window performance and uniformity.

The embodiments additionally provide microfacet-based reflective displays having engineered microfacets that can reduce ambient light reflections and improve screen contrast ratios. Such microfacet-based reflective displays can be achieved through, e.g., combinations of varying the metallization and reflectivity from certain surfaces in the microfacets, as well as using additional absorbing layers. Step heights of the microfacets can also be varied in the array of microfacets in order to further customize metallization coverage in regions where reduced metallization is desired.

Reference will now be made to the figures. It will be appreciated that the figures and features therein are not necessarily drawn to scale.

FIG. 1 shows a schematic illustration of a reflective display system including an ultra-short throw (UST) projector 101 and a reflective display 102, e.g., a conventional white reflective display in operation. The example illustrates challenges associated with UST projector-based display systems, where the UST projector 101 is configured to project light onto the conventional reflective display 102 at a high angle of incidence relative to a direction normal to the surface of the UST projector 101, e.g., from below the reflective display 102. On the left side of this figure, a ray of light 103 is incident upon the upper left corner of the reflective display 102. A reflected ray of light 104 shows schematically the direction of the reflected light if the screen were to have a mirror-like surface with no diffusive properties. In this scenario, due to the high off-normal angle of incidence, the direction of the reflected ray of light 104 points toward the upper left corner of the page and would not be observable by viewers. On the right side of the screen, another incident ray of light 105 is shown. For illustrative purposes, in this scenario, a diffusive reflective surface is assumed, and the resulting reflected light profile 106 is schematically represented by a broad triangular (or conical in 3D) shape. This broad reflected light profile 106 for the reflected light is typical of conventional reflective displays and has a benefit in that more viewers may be able to see the image on the reflective display 102. However, this conventional approach has a drawback in that the highly diffusive surface used in these conventional screens results in very low image brightness, e.g., due to a large fraction of the incident ray of light 105 being scattered towards directions where there may not be a viewer present, and a poor contrast ratio, e.g., due to a large amount of ambient light that may be directed to viewer(s) in addition to the reflected light profile 106.

Fresnel-Based Reflective Displays and Systems

Figure 2:
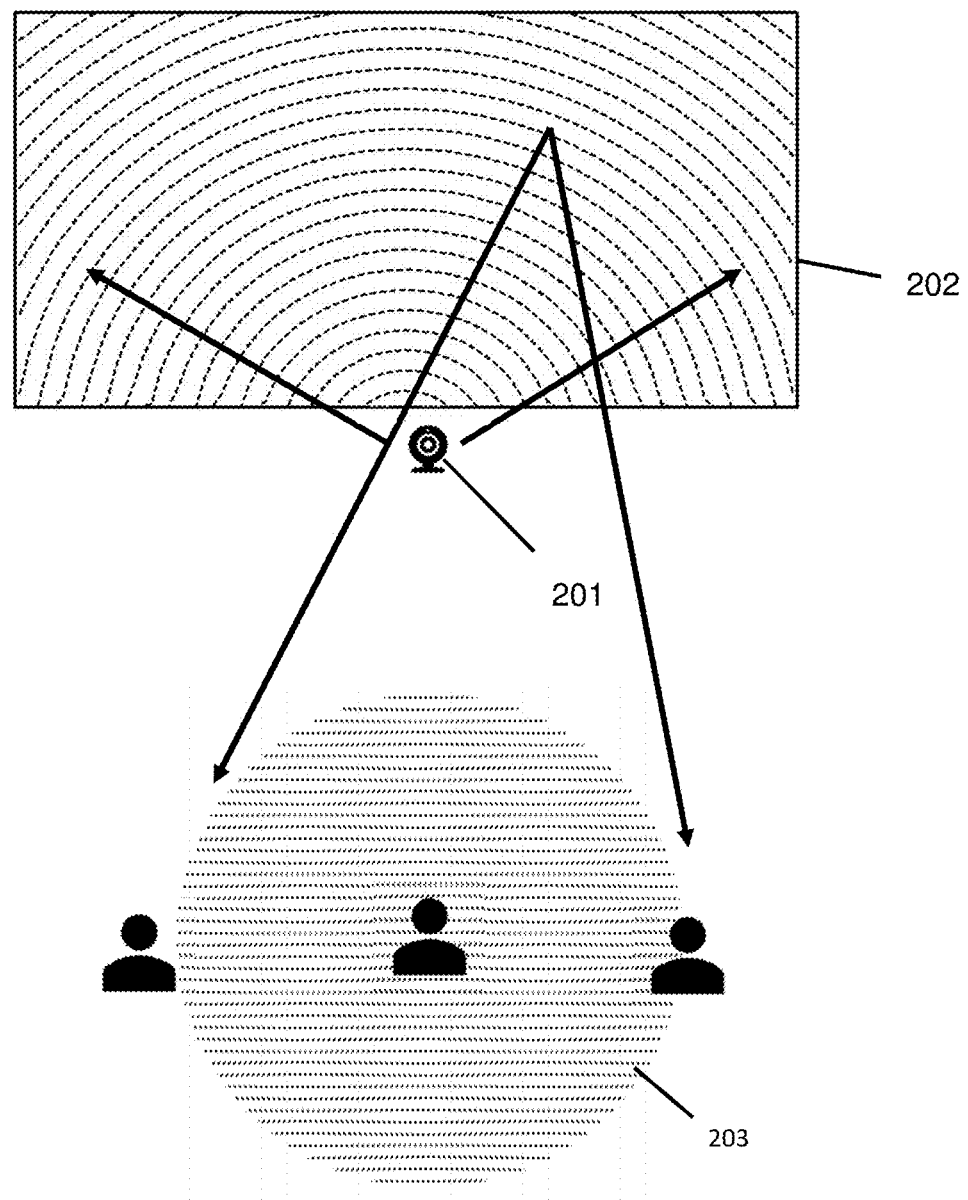
FIG. 2 illustrates an example reflective display system including a UST projector, a reflective display, and a radially symmetric diffuser.

FIG. 2 schematically illustrates a reflective display system including an ultra-short throw (UST) projector 201, a reflective display 202, and a radially symmetric diffuser formed over the reflective display 202. As described herein, a diffuser refers to a light diffusing layer or a medium interposed between a reflective display and a light source that is configured to shape or modulate an intensity distribution of light passing therethrough. For example, a diffuser can broaden or diffuse the intrinsic intensity distribution along at least one direction parallel to a major surface of reflective display. In the illustrated example, a radially symmetric diffuser is disposed over the reflective display 202. A radially symmetric diffuser in this configuration can include, e.g., an optical diffuser layer in which the amount of diffusion of light passing therethrough is approximately the same in all radial directions. In this UST configuration, the UST projector 201 is placed very close to the bottom-front of the reflective display 202. The reflective display 202 can have an offset reflective Fresnel structure as illustratively represented by the dashed line contours. Alternatively, some UST reflective displays use a louvered screen configuration with a dark color on the top surface of each louvre and a white surface on the reflective portion of the louvre. The white surface in this configuration scatters light very broadly in a radially symmetric manner. The use of a radially symmetric diffuser can result in a return light profile or a viewing window 203 that is schematically illustrated by a shaded area encompassing the middle viewer in FIG. 2. It can be seen that this type of configuration can be inefficient in light utilization, with a significant amount of light being directed above and below typical viewing locations. In addition, it may be difficult to increase the width of the viewing window 203, resulting in some viewers being nearly or completely outside of the viewing window 203 outside of which the image quality may not be acceptable.

Figure 3:
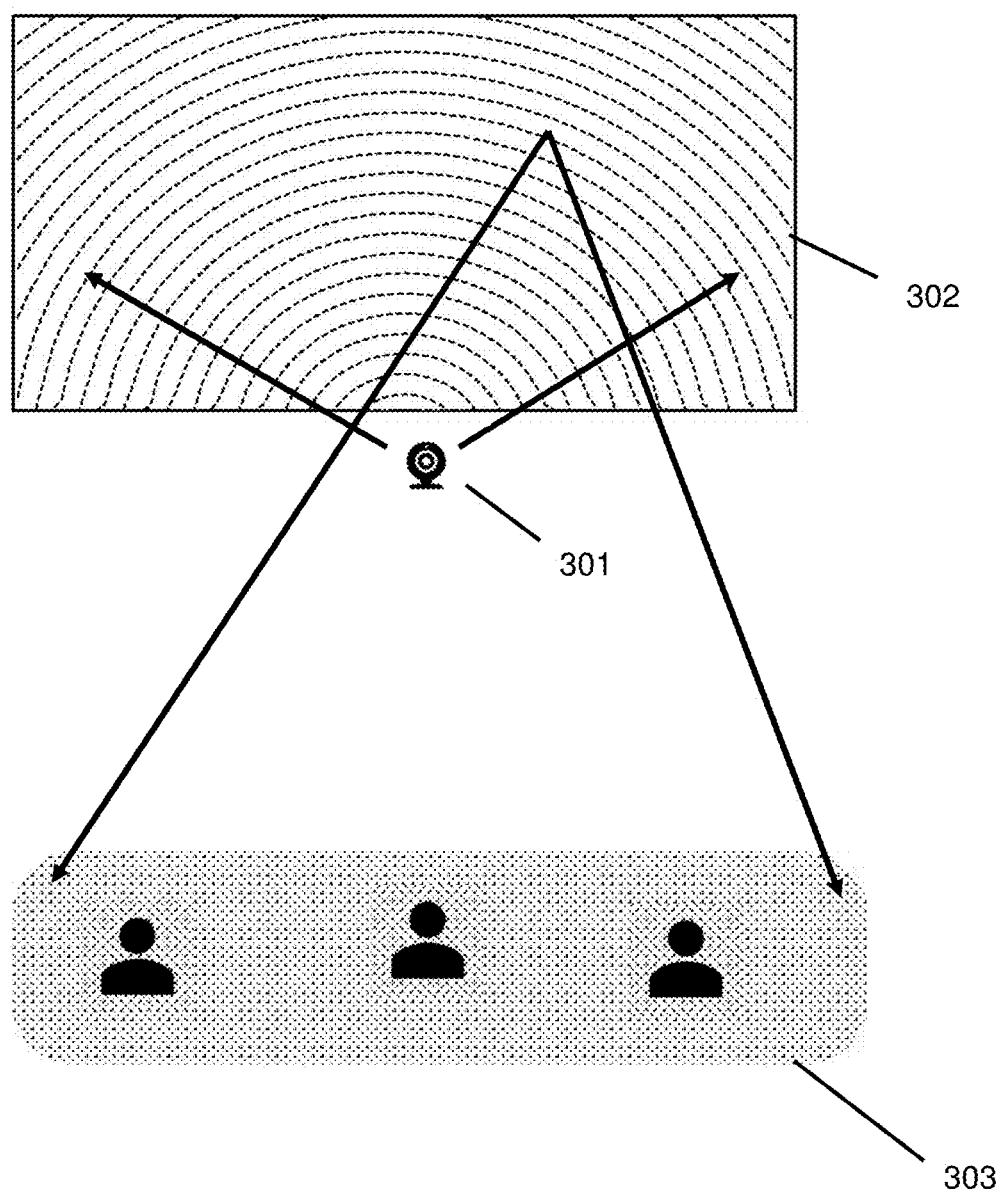
FIG. 3 illustrates an example reflective display system including a UST projector, a reflective display and an asymmetric diffuser.

FIG. 3 schematically illustrates a reflective display system including an ultra-short throw (UST) projector 301 and a reflective display 302 having formed thereover an asymmetric diffuser, according to embodiments. An asymmetric diffuser in this configuration can include, e.g., an optical diffuser layer in which the amount of diffusion of light passing through the diffuser is different in different directions, e.g., the vertical and horizontal directions. In this UST configuration, the UST projector 301 is placed very close to the front of the reflective display 302. The reflective display 302 may also have a directional reflective layer as represented by the short dashed arrow lines shown on the reflective display 302. In some implementations, the directional reflective layer may comprise an offset Fresnel optical layer similar to that described above with respect to FIG. 2. In some other implementations, the directional reflective layer can also include an array of reflective microfacets that provide a directional reflection function instead of using an offset reflective Fresnel layer. In yet some other implementations, an array of reflective microfacets may be employed to provide both the directional reflection function as well as a light shape modulation function for asymmetric diffusion. The use of an asymmetric diffuser results in a return light profile or a viewing window 303 that is schematically illustrated by a shaded area encompassing three viewers in FIG. 3. It can be seen that the illustrated reflective display system can be significantly more efficient in light utilization compared to the reflective display system described above with respect to FIG. 2, with substantially more light being directed to the proximity of the locations where viewers are most likely to be located. The range of return angles of the light reflected by screen 302, e.g., the range of return angles produced by the microfacet orientations can depend on the specific application. For example, for some applications, it may be desirable to have different effective viewing windows in the horizontal versus vertical directions, e.g., to produce an elongated viewing window such as that shown. While the illustrated reflective display system is an improvement over that described above with respect to FIG. 2, further room for improvement exists with respect to various viewing parameters including brightness, intensity uniformity, viewing window customizability, contrast, and ambient light glare reduction.

Microfacet-Based Reflective Displays

In the following, various embodiments of microfacet-based reflective displays, which may also referred to herein as microfacet-based displays, microfacet-based screens or microfacet-based projector screens, are described. The microfacet-based reflective displays have microfacets formed on a major surface thereof that are arranged such that an intensity profile within a viewing window can be customized.

Figure 4A:
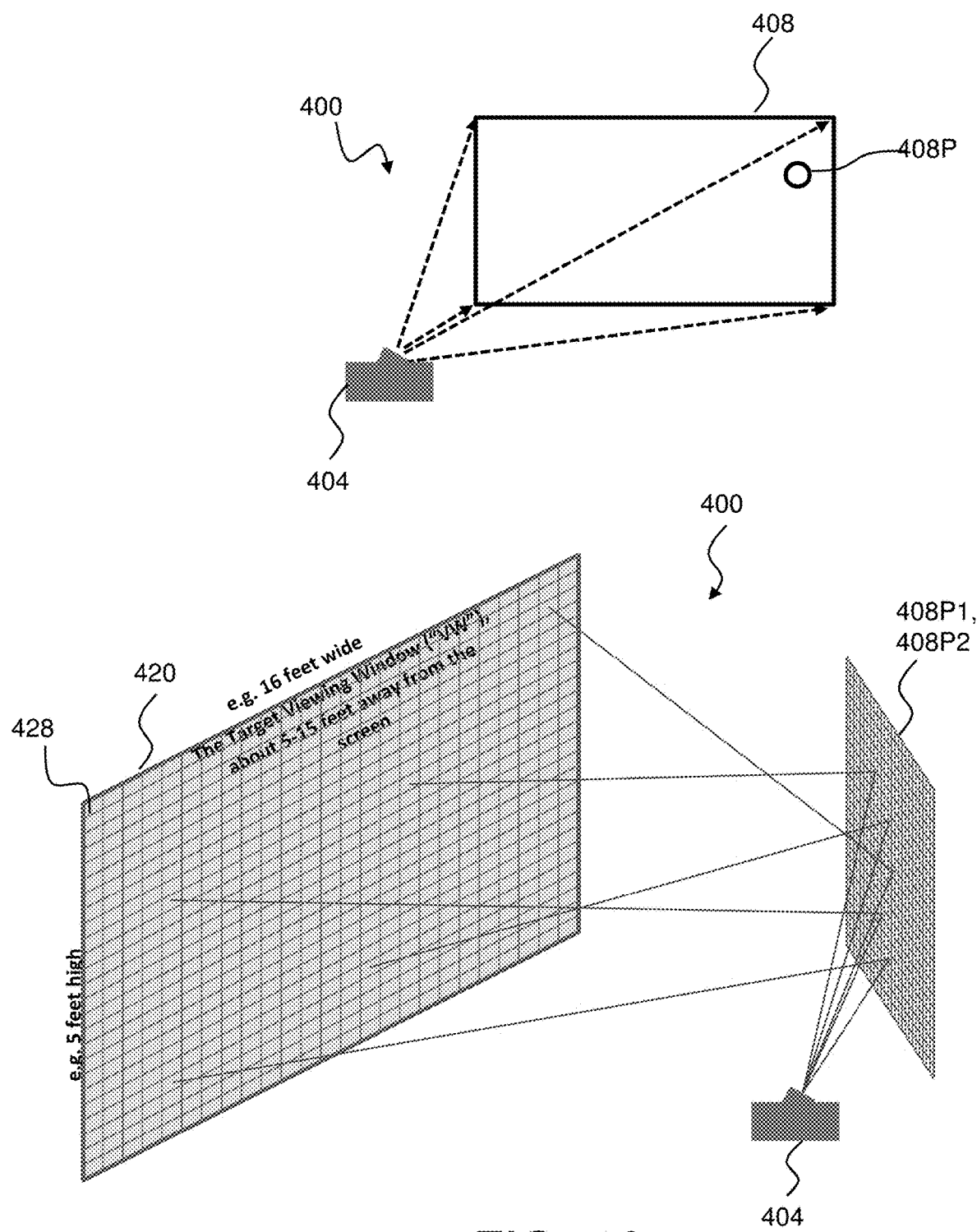
FIG. 4A illustrates perspective views of a microfacet-based reflective display system including a projector and a microfacet-based reflective display, according to embodiments.

FIG. 4A schematically illustrates a perspective view of a microfacet-based reflective display system, according to various embodiments described herein. The microfacet-based reflective display system 400 includes a microfacet-based reflective display 408 and a light source 404, e.g., a projector. The microfacet-based reflective display system 400 depicted in the upper part of FIG. 4A illustrates the light source 404 projecting light onto a microfacet-based reflective display 408. The microfacet-based reflective display comprises a plurality of portions 408P, which can be pixels or blocks, as described infra. The microfacet-based reflective display system 400 depicted in the lower part of FIG. 4A illustrates one of the portions 408P of the microfacet-based reflective display 408 reflecting the light incident thereon from the light source 404 to display an image within a viewing window 420 at a viewing distance where a viewer may be located. Each of the portions 408P comprises a plurality of light-reflective microfacets that are configured to collectively reflect the light incident thereon from the light source 404 to display the image to the viewer.

Figure 4B:
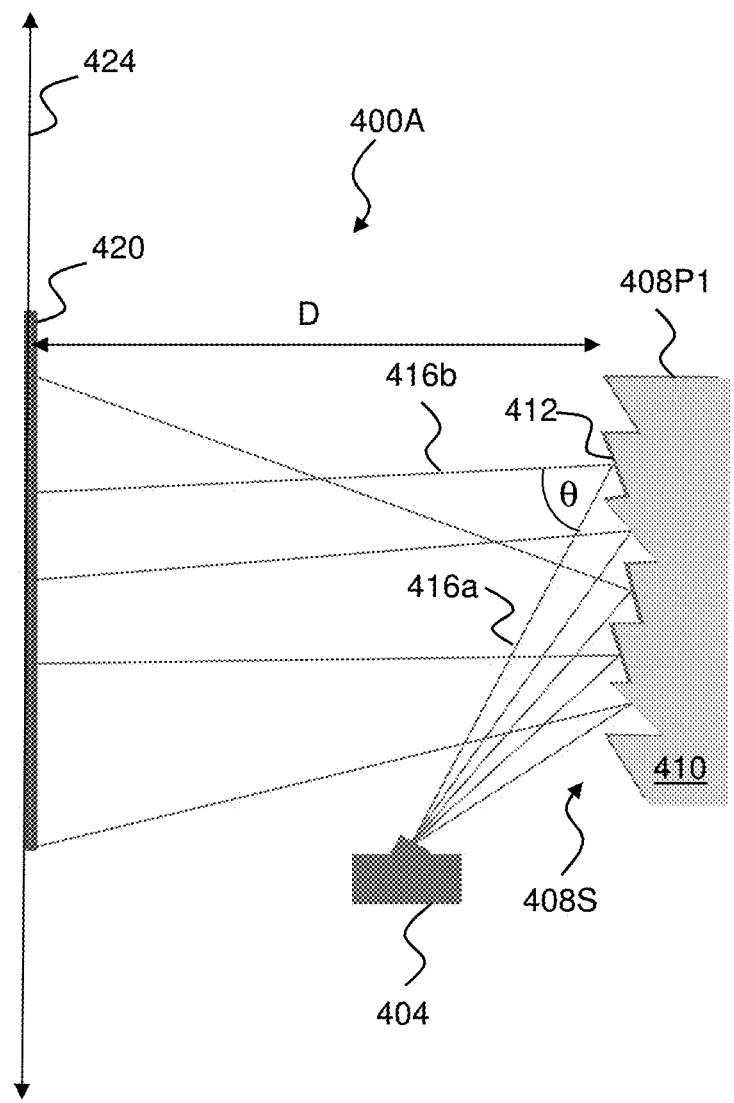
FIG. 4B illustrates a side view of a microfacet-based reflective display system including a microfacet-based reflective display configured for front-side reflection, according to embodiments.

FIG. 4B schematically illustrates a side view of an implementation of the microfacet-based reflective display system shown in FIG. 4A. In particular, the microfacet-based reflective display system 400A includes a microfacet-based reflective display 408 configured for front-side reflection. The illustrated portion 408P1 of the microfacet-based reflective display 408 comprises a plurality of light-reflective microfacets 412 that are formed on a front side thereof and configured to reflect light incident thereon, to display an image within the viewing window 420.

Figure 4C:
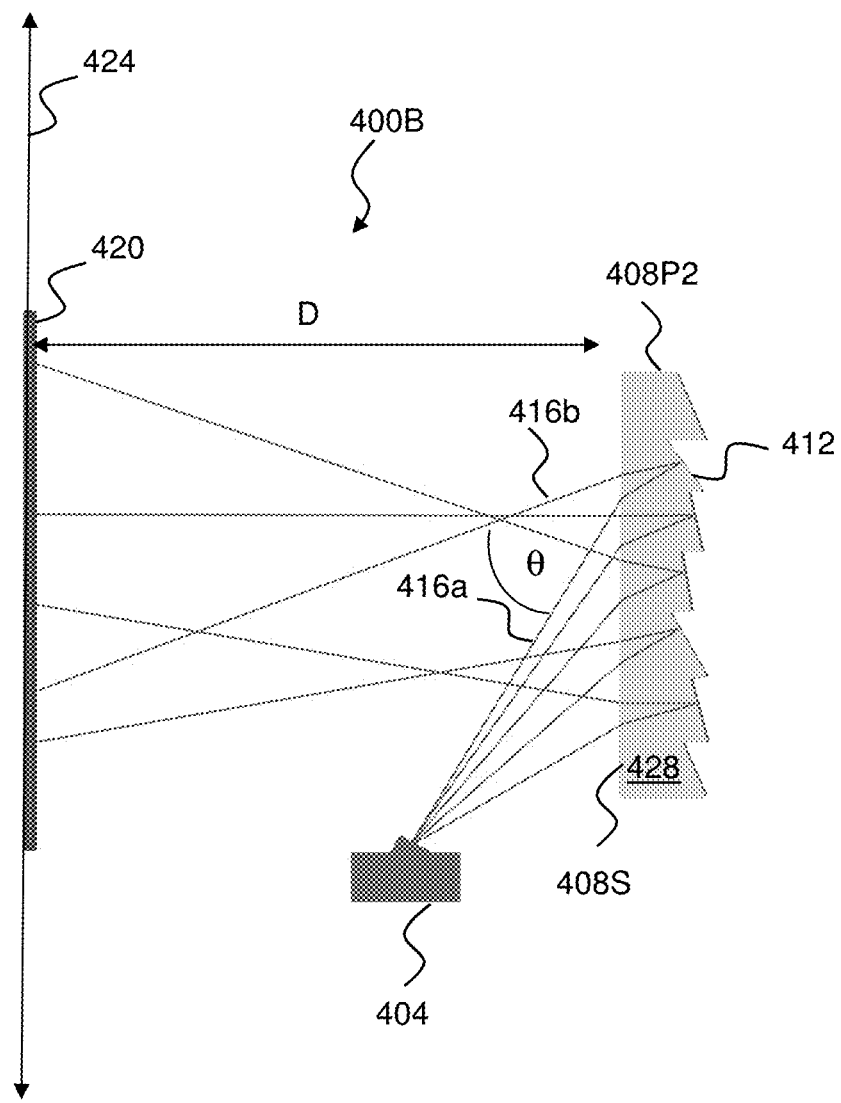
FIG. 4C illustrates a side view of a microfacet-based reflective display system including a microfacet-based reflective display configured for back-side reflection, according to embodiments.

FIG. 4C schematically illustrates a side view of another implementation of the microfacet-based reflective display system shown in FIG. 4A. In particular, the microfacet-based reflective display system 400B includes a microfacet-based reflective display 408 configured for back-side reflection. The illustrated portion 408P2 of the microfacet-based reflective display 408 comprises a plurality of light-reflective microfacets 412 that are formed on a rear side thereof and configured to reflect light incident thereon, to display an image within the viewing window 420. In the following, references are made to both FIGS. 4A and 4B, in which like numerals refer to similar components.

The light source 404 can be, e.g., a projector. As described herein, a projector refers to a light source or a light emitting device that is configured to project or direct light on to a microfacet-based reflective display. The projected light can form a still image and/or frames of a moving image (i.e., video). The projector 404 can be a cathode ray tube (CRT) projector, a liquid crystal (LCD) projector, a polysilicon LCD projector, or a digital light processing (DLP) projector, to name a few examples. Some CRT projectors include lenses, which may be on different optical axes to separately focus images of different colors of light, e.g., red, green, and blue, onto a screen. Some LCP projectors include one or more liquid crystal panels that are illuminated by a lamp, e.g., a metal halide lamp. A series of filters and reflectors may split spectrally white light into rays of red, green, and blue. Each of these beams illuminates a liquid crystal panel and the images from the panels converge at the focal point of a lens. Some DLP projectors use a microchip with thousands of micro mirrors to modulate a lamp's light and project it through one or more lenses.

The microfacet-based reflective display 408 or the portion 408P thereof comprises a major surface 408S on which the plurality of light-reflective microfacets 412 are formed. As described herein, the major surface 408S refers to the overall surface of the microfacet-based reflective display 408 or the portion 408A thereof, and not necessarily to the local topography formed by the microfacets 412. Thus, while the microfacets 412 themselves may have surfaces having different orientations and extending in different planes, the major surface 408S may refer to a general surface extending within a plane. For example, the major surface 408S in the illustrated example may be a plane formed by an average of the planes in which the microfacets 412 extend. The light-reflective microfacets 412 have light-reflective surfaces. The light-reflective surfaces may be formed by, e.g., a light reflective coating formed on a substrate 410 having a microfaceted surface. Alternatively, the light-reflective surfaces may be formed by microfacets formed on a light-reflective bulk substrate 410. The microfacets 412 are configured to display an image by collectively reflecting light incident thereon from the light source 404 in different, e.g., non-parallel directions.

As described herein, a microfacet refers to a reflective optical element having a reflective surface that is relatively highly reflective, e.g., a mirror-like surface. Depending on the material and the method used to fabricate the microfacets, the reflective properties of the microfacets can include one or both of glossy reflection and specular reflection. As described herein, glossy reflection refers to a reflection that is equal in intensity regardless of the angle of the light's incidence. On the other hand, specular reflection refers to a reflection that is more intense for light rays that arrive at a larger angle relative to a perpendicular or normal direction.

According to various embodiments, the light-reflective microfacets have generally planar light reflective surfaces that are configured to substantially reflect light incident thereon. For example, the light reflective surface of the microfacet may reflect greater than 50%, 60%, 70%, 80%, 90%, 95% or a value in a range defined by any of these values, of light incident thereon from a light source.

Still referring to FIG. 4B, each of the microfacets 412 can be characterized by a microfacet angle. As used herein, a microfacet angle of a microfacet refers to a compound angle, with two degrees of freedom, between a general normal direction of the major surface 408S and a local normal direction of the reflective microfacet surface of the microfacet. Thus, if a microfacet has a microfacet surface that is parallel to the general major surface 408S of the reflective screen 408 or the portion 408P1 thereof, the microfacet angle of the microfacet would be zero. According to various embodiments, the microfacet angle of the microfacets 412 can be greater than 1°, 2°, 5°, 10°, 20°, 30°, 40°, 50°, or a value in a range defined by any two of these values.

As described herein, a return angle refers to an angle formed by an incident ray of light directed to a location on a screen, e.g., one or more microfacets, from a light source, e.g., a lens of a projector, and a reflected ray of light from the same location on the screen. In the illustrated configuration in FIG. 4B in which the microfacets 412 directly reflect light incident thereon, a return angle θ is formed by a ray of incident light 416a incident on the illustrated microfacet 412 and a ray of reflected light 416b reflected from the same microfacet 412. In the illustrated configuration, different ones of the microfacets 412 have different orientations such that return angles formed by respective light rays incident thereon and respective ones of reflected rays of light are different. In the illustrated configuration in FIG. 4C in which the microfacets 412 reflect light incident thereon through a transparent material 428, a return angle θ is formed by a ray of incident light 416a incident on a location on a surface of the transparent material 428 corresponding to or over to a microfacet 412 reflecting the ray of incident light 416a, and a ray of reflected light 416b reflected from the same microfacet 412 and exiting from the surface of the transparent material 428.

As described herein, a viewing window refers to a two-dimensional cross-sectional area within a viewing plane parallel at a viewing distance between a microfacet-based reflective display and one or more viewers, which is formed by light reflected from the microfacet-based reflective display and crossing the viewing plane. The viewing window can be parallel to a major surface of the microfacet-based reflective display facing the viewer(s). The viewing window also refers to the two-dimensional area outside of which the intensity of the reflected light, as observed by the viewer(s), falls off substantially. For example, outside of the viewing window, the intensity of the reflected light can fall off by more than 30%, 50%, 1/e, 70%, 90%, 99%, or a value in a range defined by any of these values, relative a peak or average intensity of the reflected light crossing the viewing plane. In the illustrated configuration in FIG. 4B, a viewing window 420 is formed by the rays of reflected light crossing a viewing plane 424 at a viewing distance D from the major surface 408S of the microfacet-based reflective display 408 or the portion 408P1 thereof.

It will be appreciated that a viewing window can be described in several ways. In some examples described herein, the viewing window may be described in terms of an area within a viewing plane that is defined by lateral dimensions along lateral directions, which can be parallel to a major surface of a microfacet-based reflective display. For example, a viewing window may be described as a rectangular area within a viewing plane that is defined by a horizontal viewing length/width and a vertical viewing width/length that is spanned by the light rays reflected by the microfacet-based reflective display and crossing the viewing plane as described above, outside of which the intensity falls off by any of the above-indicated values. It will be appreciated that while a viewing window is illustrated as being rectangular in the illustrated configuration in FIGS. 4A-4C, embodiments are not so limited, and the viewing window can have any suitable shape, including a polygon, a circle or an ellipse, to name a few.

Alternatively, in some examples described herein, a viewing window may be described in terms of an area within a viewing plane that is crossed by one or more cones having an axis formed by a surface normal at a center position of a major surface of the microfacet-based reflective display and an apex formed on the center position, where the center position may be a geometric center or a centroid of the major surface of the microfacet-based reflective display. The cone(s) of angles may in turn be described by one or more angles spanned by the cone. For example, a viewing window may be described in terms of an angle in a lateral direction, e.g., a horizontal angle spanned by a cone and/or a vertical angle that is spanned by the same or a different cone, outside of which the intensity falls off by any of the above-indicated values. Thus, when the viewing window has a square shape, the viewing window may be described by the same angles in both the horizontal and vertical directions. On the other hand, when the viewing window has a rectangular shape, the viewing window may be described by different angles for the horizontal and vertical directions.

As described herein, a viewing window can be formed by one more sub-viewing windows. A sub-viewing window refers to a two-dimensional cross-sectional area within a viewing plane, which can be parallel to a major surface of a screen facing one or more viewer(s) at a viewing distance between the microfacet-based reflective display and the viewer(s), which is formed by light reflected from a portion of the screen crossing the viewing plane. In a similar manner as the viewing window, the sub-viewing window can be defined as a two-dimensional area outside of which the intensity of the reflected light from the portion of the screen falls off substantially, in any percentage as described above with respect to a viewing window. The portion of the microfacet-based reflective display corresponding to the sub-viewing window can be any suitable portion of the microfacet-based reflective display. For example, in the illustrated configuration of FIGS. 4A-4C, the portion 408P1 (FIG. 4B) or 408P2 (FIG. 4C) can be a screen pixel of a block of microfacets, as described herein. Various attributes of a sub-viewing window can be analogous to the corresponding attributes of a viewing window, except that light originating from a portion of a microfacet-based reflective display rather than the entire microfacet-based reflective display is associated with the sub-viewing window. Thus, an area overlapped by all sub-viewing windows from different portions of the reflective screen can form a viewing window.

As described herein, an incidence angle or a screen entrance angle refers to an angle formed by an incident ray of light directed to a location on a screen from light source, e.g., a lens of a projector, to a given location on a screen, e.g., one or more microfacets, and a surface normal to a major surface of the microfacet-based reflective display. In the illustrated configuration in FIG. 4B in which the microfacets 412 directly reflect light incident thereon, an incidence angle is formed by a ray of incident light 416a incident on one of the microfacets 412 and a surface normal perpendicular to the major surface 408S and the viewing plane 424. In the illustrated configuration, different ones of the microfacets 412 receive respective rays of incident light 416a at different angles due to the different locations with respect to the light source 404, such that incidence angles formed by the different incident rays of light are different. In the illustrated configuration in FIG. 4C in which the microfacets 412 reflect light incident thereon through a transparent material 428, an incidence angle with respect to the transparent material 428 is formed by a ray of incident light 416a incident on a location on the transparent material 428 corresponding to or over a microfacet 412 reflecting the ray of incident light 416a, and a surface normal perpendicular to the major surface 408S and the viewing plane 424. For the configuration in FIG. 4C, it will be appreciated that an angle of incidence can also be defined with respect to a particular microfacet 412 as an angle formed by a ray of incident light 416a incident on a particular microfacet 412 after entering the transparent material 428 and a surface normal perpendicular to the major surface 408S and the viewing plane 424. That is, for a given ray of incident light 416a, the angle of incidence on the transparent material 428 can be different from the angle of incidence on the microfacet 412 due to bending of the ray of incident light 416a upon entry into the transparent material 428 having a refractive index substantially larger than 1, as is the case for suitable transparent solid materials.

Still referring to FIGS. 4A-4C, according to various embodiments, different ones of the microfacets 412 are engineered to have orientations such that reflected light rays reflected by the different ones of the microfacets 412 are directed in different directions that are not parallel to each other. This is achieved in part by, e.g., configuring the microfacets 412 such that contiguous ones of the microfacets 412, which can span a portion of a pixel or one or more pixels, have microfacet angles that do not vary (increasing or decreasing) monotonically in a lateral direction to account for the different locations of the microfacets, e.g., the vertical and/or horizontal directions. It will be appreciated that such arrangement can be advantageous over an arrangement in which the reflected light rays are substantially parallel to each other. For example, the size and/or shape of the resulting viewing window 420 can be customized, e.g., to be larger than the size of the microfacet-based reflective display 408. In addition, a viewer can view the image formed by substantially the entire screen regardless of a specific location within the viewing window 420 the viewer's eyes or viewers may be located.

The light rays reflected by the microfacets 412, as a collective whole, can diverge or converge from the major surface 408S of the microfacet-based reflective display in at least one direction to form an image within the viewing window 420 having a greater or smaller dimension than that of the microfacet-based reflective display 408/408A in that direction. A larger viewing window may be desired, e.g., to accommodate multiple viewers within the viewing window. A smaller viewing window may be desired, e.g., to improve privacy of the viewer.

As illustrated in FIGS. 4A-4C, the microfacets 412 have a distribution of microfacet orientations such that light rays reflected by each one of different portions 408P1 (FIG. 4B), 408P2 (FIG. 4C), which can include pixels or blocks, can substantially cover the entire viewing window 420. That is, the light rays reflected by the microfacets 412 of a given portion 408P1, 408P2 and crossing the viewing plane 424 are distributed within the viewing window 420 to substantially span the entire area thereof. As described herein, a substantial coverage or spanning of the viewing window 420 by the reflected light rays crossing the viewing window 420 refers to a coverage area spanning greater than 50%, 60%, 70%, 80%, 90%, 99% or a value in a range defined by any of these values, relative to the area of the viewing window 420. A coverage area can be defined, e.g., by an area defined by connecting outermost points crossed by the reflected light rays. A coverage area can also be defined by the intensity fall off, as described above with respect to the viewing window.

As described above, the illustrated portions 408P1 (FIG. 4B), 408P2 (FIG. 4C) can represent a screen pixel or a block of microfacets among the plurality of microfacets 412 of the microfacet-based reflective display 408 (FIG. 4A). As described herein, a screen pixel or a block represents a portion or a sub-region of the microfacet-based reflective display 408/408A including a portion of the total number of microfacets 412 of the reflective screen 408. Adjacent pixels or blocks do not overlap with each other or share microfacets therebetween. As described herein, the concepts of a screen pixel and a block may overlap in some contexts. However, in other contexts, the concepts of a screen pixel and a block are distinguishable. When a sub-region of the microfacet-based reflective display 408 is referred to as a screen pixel, it will be understood that the described portion or sub-region corresponds to a resolvable portion of the microfacet-based reflective display 408 according to the resolution thereof. For example, the screen pixel can correspond to a sub-region or a portion of the microfacet-based reflective display 408 that includes at least two microfacets while being sufficiently small in size to provide a target resolution. A screen pixel can include, e.g., more than 2, 5, 10, 20, 50, 100, 200, 500, 1000, 2000, 5000, 10,000 microfacets or a value in a range defined by any of these values, for instance 625. On the other hand, when a portion or a sub-region of the microfacet-based reflective display 408 is referred to as a block of microfacets, it will be understood that the described portion or a sub-region can correspond to a portion of the microfacet-based reflective display 408 that is larger than a screen pixel or a resolvable portion of the microfacet-based reflective display 408 according to the resolution thereof. Thus, a block may contain one or more screen pixels including a fraction of screen pixels greater than 1.

In some embodiments, different pixels or blocks can have the same number of microfacets. However, embodiments are not so limited, and different pixels or blocks can have different numbers of microfacets. According to embodiments, a pixel or a block can include a suitable number of microfacets depending on one or more of the size of the microfacets, the dimensions of the reflective screen and/or the resolution provided by the projector. For example, a pixel or block can have m×n microfacets, where each of m and n can be greater than 2, 5, 10, 50, 100 or a value in range defined by any of these values, for instance 25. Depending on the number of microfacets per pixel or block, a microfacet-based reflective display according to embodiments can include M×N pixels or blocks, where M represents the number of pixels or blocks in a lengthwise direction of the reflective screen and N represents the number of pixels or blocks in a widthwise direction of the reflective screen. Each of M and N can be, e.g., greater than 100, 200, 500, 1000, 2000, 5000, 10,000, 20,000, 50,000 or a value in range defined by any of these values. The m, n, M and N can be customized to provide a target resolution, which may be, e.g., 4K (e.g., 4096×2160 pixels), HD (1920×1080 pixels), WXGA (1280×800 pixels) and XGA (1024×768 pixels), or a resolution exceeding or between any of these resolutions.

Referring to FIG. 4A, the viewing window 420 comprises or may be divided into a plurality of non-overlapping viewing window regions 428. As illustrated, the non-overlapping viewing window regions 428 can occupy the same area within the viewing plane 424 as the viewing window 420. Each of the non-overlapping viewing window regions 428 abuts adjacent ones of the non-overlapping viewing window regions 428 on all sides. According to various embodiments, different ones of the microfacets 412 within a portion 408P1 (FIG. 4B), 408P2 (FIG. 4C), which can represent a pixel or a block, are configured to direct respective reflected light rays to different ones of the non-overlapping viewing window regions 428 of the viewing window 420. In the illustrated configurations of FIGS. 4A-4C, the viewing window 420 is divided to have the same number of the non-overlapping viewing window regions 428 as the number of light-reflective microfacets 412 within a given a portion 408P1 (FIG. 4B), 408P2 (FIG. 4C), which can be a pixel or a block. By way of example only, when the portion 408P1 (FIG. 4B), 408P2 (FIG. 4C) has 25×25=625 microfacets 412, the viewing window 420 may also have the same 25×25=625 non-overlapping viewing window regions 428. For a viewing window having a width of 16 feet and a height of 5 feet by way of example only, each of the non-overlapping region may be 0.64×0.2=0.128 ft$^2$. As illustrated in FIGS. 4A-4C, according to some embodiments, each of the microfacets 412 within at least some portions 408P1 (FIG. 4B), 408P2 (FIG. 4C) of the reflective screen 408 are configured to direct respective reflected ray into a unique one of the non-overlapping viewing window regions 428.

Generally according to embodiments, there may be a correspondence between the number of microfacets 412 within a portion 408P1 (FIG. 4B), 408P2 (FIG. 4C), e.g., a pixel or a block, of the microfacet-based reflective display and the number of non-overlapping viewing window regions 428. For example, the number of microfacets 412 within a pixel or a block and the number of non-overlapping viewing window regions 428 may be the same or may be related by a proportionality factor. In the illustrated example, the number of microfacets 412 within a pixel or a block and the number of non-overlapping viewing window regions 428 are each 625 (25×25).

According to embodiments, a portion 408P1 (FIG. 4B), 408P2 (FIG. 4C), e.g., a pixel or a block, may be arranged as an array including m×n microfacets 412 formed by m columns of the microfacets 412 arranged in order and n rows of the microfacets 412 arranged in order. Thus, a microfacet 412 may be identified by an ith column and a jth row, where i=1, 2, . . . , m and j=1, 2, . . . , n. Similarly, the illustrated viewing window 420 may have m×n non-overlapping regions 428 formed by n columns of the non-overlapping viewing window regions 428 and m rows of the non-overlapping viewing window regions 428, when the number of microfacets 412 within a pixel or a block and the number of non-overlapping regions 428 are the same (i.e., m×n). Thus, a non-overlapping viewing window region 428 of the viewing window 420 may be identified by a kth column and a lth row, where k=1, 2, . . . , m and l=1, 2, . . . , n. In at least some pixels or blocks, a microfacet 412 having a certain column (i) and row (j) combination does not reflect light onto a non-overlapping viewing window region 428 having the same column (k=i) and row (l=j) combination.

In some configurations, the microfacets 412 of a given portion 408P1, 408P2 may be assigned to reflect light onto the viewing window 420 that is divided into non-overlapping regions 428 having the same area. However, in some other configurations, the viewing window 420 that is divided into non-overlapping regions 428 having different areas. For example, the non-overlapping areas 428 may have different areas, e.g., based on a solid angle or Lambert's cosine law, as described infra with respect to FIG. 8, While the illustrated portion 408P1 (FIG. 4B), 408P2 (FIG. 4C) may represent one pixel or one block, at least some or all of the pixels or blocks of the microfacet-based reflective display 408 may also be configured such that different ones of the microfacets 412 within each of the pixels or blocks are configured to direct respective reflected light rays to different ones, e.g., unique ones, of non-overlapping viewing window regions 428 of the viewing window 420.

In some configurations, the corresponding microfacets 412 of different pixels or blocks may be configured to direct respective reflected light rays to the same ones of non-overlapping viewing window regions 428. That is, in at least some pixels or blocks, a microfacet 412 of one of the pixels or blocks having a certain column (i) and row (j) combination and a microfacet 412 of another one of pixels blocks having the same corresponding column (i) and row (j) combination reflect light onto the same non-overlapping viewing window region 428. In other configurations, the corresponding microfacets 412 of different pixels or blocks may be configured to direct respective reflected light rays to different ones of non-overlapping viewing window regions 428. That is, in at least some pixels or blocks, a microfacet 412 of one of the pixels or blocks having a certain column (i) and row (j) combination and a microfacet 412 of another one of pixels blocks having the same corresponding column (i) and row (j) combination do not reflect light onto the same non-overlapping viewing window region 428. The correspondence or lack thereof between corresponding microfacets 412 of different pixels or blocks are further described infra.

In the embodiment illustrated in FIG. 4B, the portion 408P1 of the microfacet-based reflective display 408 is configured such that the light (e.g., the incident ray of light 416a) from a light source 404 is directly incident on the portion 408P1, and the light (e.g., the reflected light ray 416b) reflected by the light-reflective microfacets 412 directly reaches the viewing window 420. That is, the light-reflective microfacets 412 form the uppermost surface of the microfacet-based reflective display 408 and there may not be intermediate structures or medium in the path of the light from the light source 404 and the viewing 420. Such configuration may be referred to herein as front-side reflection mode.

In contrast, in the embodiment illustrated in FIG. 4C, the illustrated portion 408P2 of the microfacet-based reflective display 408 shows a transparent material 428 having a backside on which light-reflective microfacets 412 are formed. In a similar manner as described above with respect to the reflective the display system 400, 400A described with respect to FIGS. 4A-4B, the illustrated microfacet-based reflective display system 400B includes a microfacet-based reflective display 408 having a portion 408P2 thereof and a light source 404. The microfacet-based reflective display 408 having the portion 408P2 thereof comprises a plurality of light-reflective microfacets 412 that reflect light incident thereon from the light source 404 to display an image within a viewing window 420. However, unlike the microfacet-based reflective display 408 and the portion 408P1 thereof illustrated in FIG. 4B, the microfacets 412 illustrated in FIG. 4C are not formed at the uppermost or projector-facing surface of the microfacet-based reflective display 408. Instead, the microfacets 412 are formed on the rear surface of the transparent material 428. That is, unlike the embodiment described above with respect to FIG. 4B, the surface of the transparent material 428 forms a planar major surface 408S and the projector-facing surface of the microfacet-based reflective display 408. As a result, instead of the light (e.g., the incident light ray 416a) from the light source 404 being directly incident on the microfacet-based reflective display microfacets 412, the light is first incident on the transparent material 428 before being reflected by the microfacets 412. Similarly, instead of the reflected light (e.g., the reflected light ray 416b) directly reflecting into the viewing window 420, the reflected light passes through the transparent material 428 before reaching the viewing window 420. Such configuration may be referred to herein as back-side reflection mode.

Still referring to FIG. 4C, the transparent material 428 may be configured such that an angle of incidence of the incident light ray 416a incident on a location on the surface of the transparent material 428 is greater than an angle of incidence of the incident light ray 416a incident on the corresponding microfacet 412 formed on the backside of the transparent material 428. Advantageously, the transparent material 428 allows for the microfacet angles of the microfacets 412 to be shallower or less tilted relative to those described above with respect to FIG. 4B without the transparent material 428, for displaying an image within a comparable viewing window 420. This in turn may allow for the illustrated microfacet-based reflective display system 400B to have the light source 404 positioned for greater angle of incidence relative to the microfacet-based reflective display system 400A described above with respect to FIG. 4B. For example, the microfacet angles of the microfacets 412 may be reduced, e.g., on average, by more than 1°, 2°, 5°, 10°, 20°, 30°, 40°, 50°, or a value in a range defined by any two of these values, depending on the refractive index of the transparent material 428. The angle of incidence of the incident light may be increased, e.g., on average, by similar or the same magnitude. Alternatively, the tilt angles of the facets can be smaller, which simplifies their fabrication process and can reduce its cost.

The transparent material 428 comprises an optically transparent polymeric material selected from the group consisting of polyethylene terephthalate (PET), polymethyl methacrylate (PMMA), polystyrene (PS), polycarbonate (PC) or a combination thereof. The index of refraction of the transparent material 428 can be greater than 1.1, 1.2, 1.3, 1.4, 1.5, 1.6, 1.7, 1.8, or a value in a range defined by any of these values. The transparent material 428 can have a thickness greater than 1 µm, 10 µm, 100 µm, 1 mm, 10 mm, or a value in a range defined by any of these values.

In various embodiments, the microfacets of the microfacet-based reflective display are arranged, e.g., at least partly randomly, to have a substantially uniform intensity profile within at least a portion of the viewing window. As described herein, a substantially uniform intensity profile can have an intensity variability of less than 50%, 45%, 40%, 35%, 30%, 25%, 20%, 15%, 10%, 5%, 1%, or a value in a range defined by any of these values, which can be quantified by a standard deviation or a range of the intensity, relative to an average, mean or median intensity of the projected image within the viewing window.

Various microfacet-based reflective displays disclosed herein can have various sizes and configurations. The screen can be substantially flat or curved. When curved, the curvature of the screen can be either convex or concave with respect to the viewer. The screen can have a width of at least about 1 meter (m), 2 m, 5 m, 10 m, 20 m, 30 m, 40 m, 50 m, or a value in a range defined by any of these values, and a height of at least about 0.5 m, 1 m, 2 m, 5 m, 10 m, 20 m, 50 m, or a value in a range defined by any of these values. The screen can also have a shape that is not rectangular. For example, the screen can have any suitable polygonal, oval or circular shape. The screen can also be non-stationary.

For various microfacet-based reflective displays disclosed herein, the light source or the projector can be placed at a suitable location for a particular purpose. For example, the projector can be disposed at a suitable location between the viewer and the microfacet-based reflective display. The projector can be disposed at a suitable distance from the microfacet-based reflective display, e.g., to obtain a desired throw ratio. The projector can be disposed outside of the lateral area occupied by the microfacet-based reflective display such that when the microfacet-based reflective display is viewed in a direction normal to the microfacet-based reflective display, the projector does not overlap the area of the microfacet-based reflective display. The projector can be disposed at any suitable location outside of an edge of the microfacet-based reflective display. For example, for ST and UST applications, it may be desirable to dispose the projector below a bottom edge of the microfacet-based reflective display, e.g., below a central bottom edge of the microfacet-based reflective display. Thus, according to some embodiments, the microfacet-based reflective display is configured to reflect the light from a projector disposed vertically below a lower edge of the microfacet-based reflective display. In some other embodiments, the display is configured to reflect the light from the projector disposed vertically above the upper edge of the microfacet-based reflective display, horizontally to the left of the left edge of the display or to the right of the right edge of the display when the microfacet-based reflective display is viewed from a viewer facing the microfacet-based reflective display along a normal direction crossing a central location of the microfacet-based reflective display.

For various microfacet-based reflective displays disclosed herein, the projector can be disposed to project light at a relatively shallow projection angle relative to the plane of the microfacet-based reflective display. For example, the lens of the projector can be configured to project incident light at a projection angle of 5°, 10°, 20°, 30°, 40°, 50° or a value in a range between any of these values, relative to the plane of the microfacet-based reflective display.

For various microfacet-based reflective displays disclosed herein, microfacets or display locations corresponding thereto can provide return angles that have a suitable value depending on various factors including the angles of incidence of the light on the microfacets or corresponding locations on the microfacet-based reflective display and the orientations of the microfacets. For example, microfacets or display locations corresponding thereto can provide return angles that have a value greater than 40°, 60°, 80°, 100°, 120°, 140°, 160°, or a value in a range between any of these values. For example, when the microfacet-based reflective display is configured to reflect light in a direction substantially normal to the major surface of the microfacet-based reflective display, the return angle between the light incident on the microfacet-based reflective display from the lens of the projector and the reflected light from the screen may be relatively small. For example, in these configurations, the return angle can have a value smaller than 85°, 80°, 70°, 60°, 50°, 40° or a value in a range defined by any of these values.

Unless disclosed contrariwise, various microfacet-based reflective display embodiments described herein can have similar viewing window attributes as the microfacet-based reflective display described with above with respect to FIGS. 4A-4C. For example, the viewing window can have a horizontal dimension (length or width) defined, at a viewing distance D (FIGS. 4B-4C), by a horizontal angle formed by a cone having an apex formed at and an axis through a surface normal at a center position of the screen spanning, e.g., +/−10 degrees, +/−20 degrees, +/−30 degrees, +/−40 degrees, +/−50 degrees or more, or a value in a range defined by any two of these values. The viewing window can also have a vertical dimension (width or length) defined, at a viewing distance D (FIGS. 4B-4C), by a vertical angle formed by a cone having an apex formed at and an axis through a surface normal at a center position of the screen spanning, e.g., +/−1 degrees, +/−3 degrees, +/−5 degrees, +/−8 degrees, +/−10 degrees, +/−15 degrees, +/−30 degrees or more, or a value in a range defined by any two of these values. The vertical and horizontal dimensions of the viewing window can be the same in some embodiments.

As described above with respect to FIGS. 4A-4C, the light reflected by the microfacet-based reflective display 408 can collectively converge or diverge to cross a viewing window having dimensions and/or a shape that can be different from those of the microfacet-based reflective display 408 itself. In some embodiments disclosed herein, one or more of the lateral dimensions of the viewing window are greater than corresponding lateral dimensions of the microfacet-based reflective display by a factor greater than 1, 1.5, 2.0, 2.5, 3.0, 3.5, 4.0, 4.5, 5.0 or a value in a range defined by any of these values. Such dimensions may be desirable, e.g., for microfacet-based reflective displays configured for viewing by multiple viewers. However, embodiments are not so limited, and in some other embodiments, one or more of the lateral dimensions of the viewing window may be smaller than corresponding lateral dimensions of the microfacet-based reflective display by a factor greater than 1, 1.5, 2.0, 2.5, 3.0, 3.5, 4.0, 4.5, 5.0 or a value in a range defined by any of these values.

The dimensions of the viewing window can alternatively or additionally be described based on an area within a viewing plane. The viewing plane can be at a distance D (FIGS. 4B-4C) from the microfacet-based reflective display exceeding, e.g., 1 m, 2 m, 5 m, 10 m, 20 m, 30 m, 40 m, 50 m, or having a value in a range defined by any of these values. The viewing window can have a horizontal dimension that can be greater than 1 m, 2 m, 5 m, 10 m, 20 m, 30 m, 40 m, 50 m, 60 m, 70 m or a value in a range defined by any of these values, and a vertical dimension that can be greater than 0.1 m, 0.2 m, 0.5 m, 1 m, 2 m, 5 m, 10 m, 20 m or a value in a range defined by any of these values, depending on size of the screen and the viewing plane distance from the screen.

According to various embodiments disclosed herein, microfacet-based reflective displays and systems are suitable as LT, ST and UST microfacet-based reflective displays and systems and can have a throw ratio greater than about 1.5, 1.4, 1.3, 1.2, 1.1, 1.0, 0.9, 0.8, 0.7, 0.6, 0.5, 0.4, 0.3, 0.2, 0.1 or a value in a range defined by any of these values. In particular, the microfacet-based reflective displays and systems can be particularly suitable as ST and UST microfacet-based reflective displays and systems having a throw ratio less than about 1.0, 0.9, 0.8, 0.7, 0.6, 0.5, 0.4, 0.3, 0.2, 0.1 or a value in a range defined by any of these values.

According to various embodiments, microfacets according to embodiments may have a major reflective surface having any suitable shape including, but not limited to, a regular shape such as a circular, elliptical or polygonal shape. A polygonal shape may include, e.g., a square, triangular, hexagonal or parallelogram, to name a few examples. However, examples are not limited and the microfacets may have an irregular shape that may not be described as any of the above shapes.

According to various embodiments, microfacets have a reflective major surface having area that is less than 1 mm$^2$, 0.1 mm$^2$, 0.01 mm$^2$, 0.001 mm$^2$, 1×10$^{-4}$ mm$^2$, 1×10$^{-5}$ mm$^2$, 1 µm$^2$, 0.1 µm$^2$ or an area in a range defined by any of these values. When the microfacets have a regular shape, the longest lateral distance defined by a straight line connecting two points of a perimeter (e.g., a diameter of a circle or a length of a rectangle) can be greater than or smaller than 1 mm, 0.1 mm, 0.01 mm, 1 µm, 0.1 µm or 100 nm or a value in range defined by any of these values.

According to various embodiments, the number of microfacets in the microfacet-based reflective displays disclosed herein can be at least 1×10$^7$, 2×10$^7$, 5×10$^7$, 1×10$^8$, 2×10$^8$, 5×10$^8$, 1×10$^9$, 2×10$^9$, 5×10$^9$, 1×10$^{10}$, 2×10$^{10}$, 5×10$^{10}$, 1×10$^{11}$ or a value in a range defined by any of these values.

According to various embodiments, for improved brightness, high fraction of the overall major surface area of the microfacet-based reflective display is occupied by the microfacets. For example, the fraction of the overall surface area of the microfacet-based reflective display occupied by the microfacets can exceed 60%, 70%, 80%, 90%, 95%, 99% or a value in a range defined by any of these values.

According to various embodiments, at least a subset of the microfacets of the microfacet-based reflective display are oriented such that a light ray reflected from each microfacet of the subset crosses a corresponding location within the viewing window. The subset of the microfacets that has a corresponding location within the viewing window can be at least 70%, 90%, 90%, 95%, 99% of the total number of microfacets of the screen, or a percentage in a range defined by any of these values.

The microfacets may have a smooth surface or an intentionally curved or intentionally roughened surface. When the surface is roughened, the roughness is defined such that a ratio of the intensity of an incident light incident on a microfacet to the intensity of a reflected light from the microfacet can be greater than 0.9, 0.8, 0.7, 0.6, 0.5, 0.4, 0.3, 0.2, 0.1 or a value in a range defined by any of these values. The reflected light from a microfacet may have a distributed intensity such that a full width at half maximum, defined relative to the peak intensity, may span at least +/−1 degrees, +/−3 degrees, +/−5 degrees, +/−8 degrees +/−10 degrees, +/−15 degrees, +/−20 degrees, +/−30 degrees, +/−40 degrees, +/−50 degrees, or a value in a range defined by any of these values. The distributed intensity may be symmetric or asymmetric about a direction of peak intensity.

The microfacets may be completely flat or may include slight positive or negative curvatures. The curvature, defined as a reciprocal of the radius of curvature, can be, e.g., less than 0.1, 0.001, 0.0001, 0.00001 or a value in a range defined by any of these values. When the microfacets have a curvature, a microfacet angle may be defined as an angle between a general normal direction of a major surface of the microfacet-based reflective display, and an average value of local normal directions of the curved major reflective surface the particular microfacet having the microfacet angle.

Figure 4D:
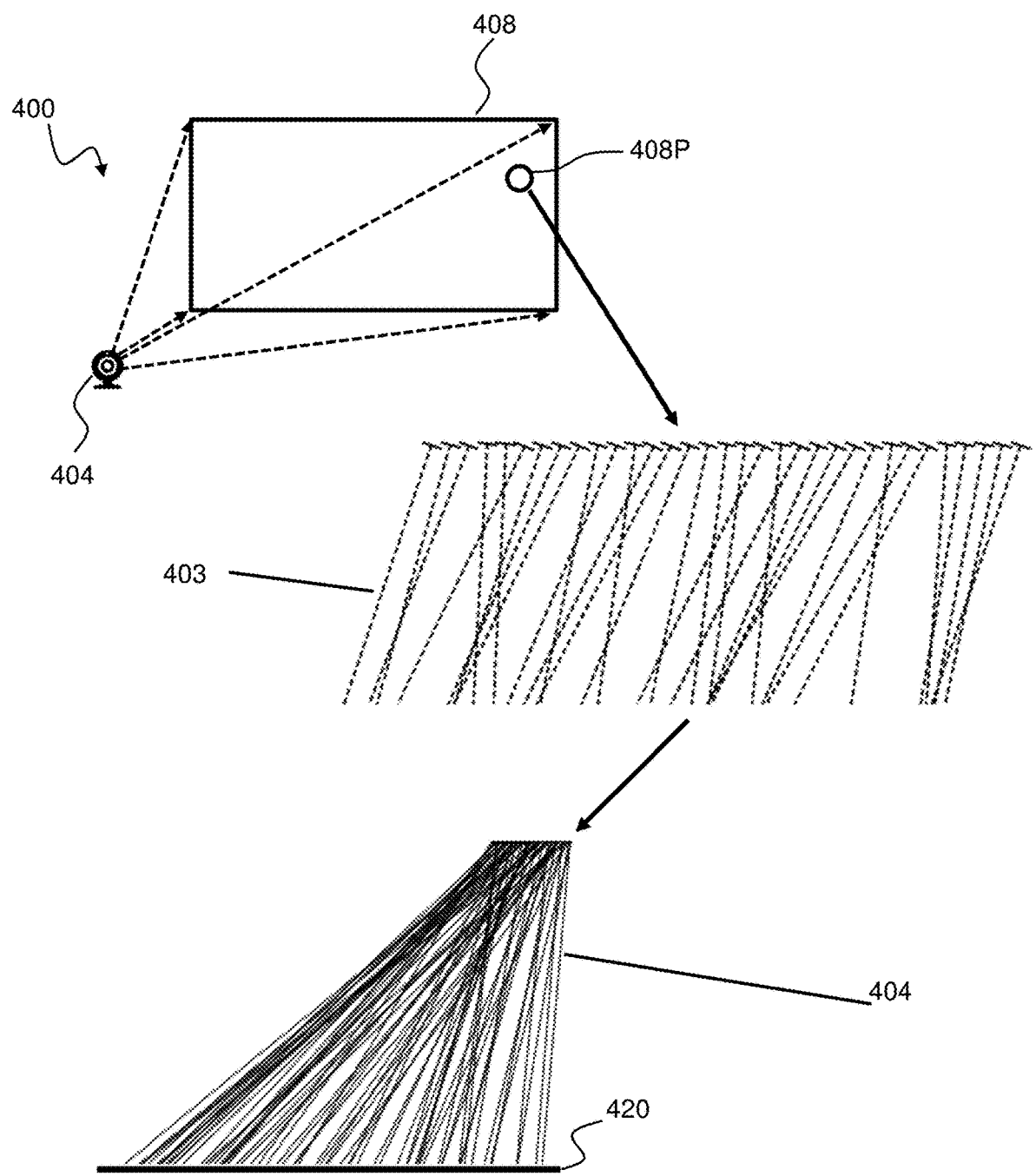
FIG. 4D shows a schematic illustration of a microfacet-based reflective display system including a reflective display configured to provide customized directional reflection and customized light shape, according to embodiments.

By customizing various attributes of the microfacet-based reflective displays described herein, the direction of reflection as well as the intensity profile of the reflected light can be customized. FIG. 4D shows a microfacet-based reflective display system including a reflective microfacet-based display configured to provide customized directional reflection and light shape modulation, according to embodiments. The projection-based display system 400 includes a representative projector 404 and microfacet-based reflective display 408 combination. It will be appreciated that while, for illustrative purpose only, the projector 404 is depicted as being disposed adjacent a far left location of the screen, implementations are not so limited, and the projector can be placed in any suitable location suitable for projecting an image described above, e.g., any suitable location for a UST configuration. A magnified top-down view of a portion 408P of the microfacet-based reflective display 408 is shown in the middle of FIG. 4 microfacet, according to an embodiment. The portion 408P represents an area of the screen which encompasses a plurality of microfacets as described above, represented by slanted segments in FIG. 4D. Since the projector location is far to the left of a particular location on the screen, the average and median of directions faced by the microfacets may be oriented with slightly clockwise orientation relative to the plane of the major surface of the screen when viewed top-down. To adjust for different positions of different portions of the screen relative to the projector, different portions of the screen can be adjusted to have different average microfacet orientations, which can be determined based on suitable geometric calculations. The actual distribution of microfacet angles at each portion can then be engineered to have a distribution of return angles. For example, in the portion 408P, while all of the drawn microfacets are oriented clockwise from the plane of the screen, some of the microfacets may be oriented to have a slightly larger or smaller microfacet angle. The middle of FIG. 4D illustrates the resulting reflected rays of light 403 for the illustrated microfacets of the portion 408P. The resulting reflected rays of light 403 for the same set of microfacets are shown at a lower magnification to better visualize the combination of directional and spreading functions with respect to a viewing window 420 in the bottom of FIG. 4D. The illustrated example shows that the microfacets provide a two-fold technical effect. First, it can be seen that an average direction of the distribution of reflected light rays is directed towards a desired direction, e.g., towards the left in the illustrated example. Second, the distribution of reflected light rays introduces a suitable spread in the reflected light profile. As illustrated, a key technical advantage of using arrays of reflective microfacets according to various embodiments described herein is that both the direction of reflected light as well as the spread of reflected light can be simultaneously controlled with the same optical layer including the microfacets. A key characteristic for this preferred embodiment is that the orientations of the microfacets of the screen, which may be arranged as an array, may be designed such that different portions of the screen (e.g., different pixels or blocks as described herein) at different locations on the screen have different average microfacet orientations. For example, each portion (e.g., a pixel or a block) of the screen may have microfacets having an average microfacet orientation such that on average, the light from the projector may be reflected towards a central location of a viewing window, while the spread is such that light from each portion (e.g., a pixel or a block) substantially spans the viewing window 420 or a sub-viewing window thereof, where the over-laid combination of the sub-viewing windows can form the overall viewing window.

Figure 5:
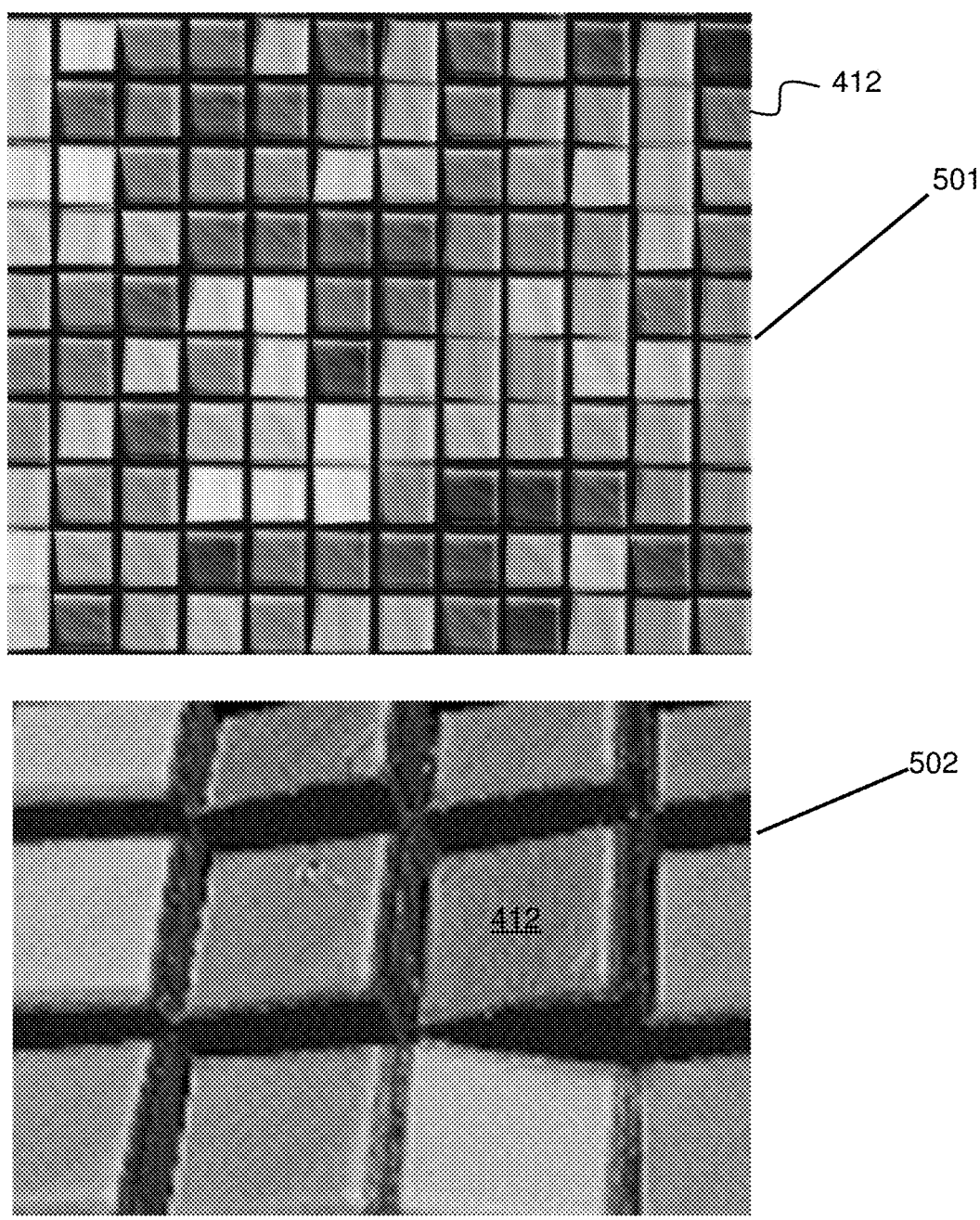
FIG. 5 shows scanning optical microscope images of microfacets fabricated according to embodiments.

FIG. 5 shows optical microscope images of microfacets fabricated according to embodiments. The images 501, 502 show the fabricated microfacets 412 at different magnifications and image angles. The imaged facets 412 are approximately square in shape and have nominal length and width of about 20 µm. The microfacets can be part of, e.g., a portion 408P1 (FIG. 4B) or 408P2 (FIG. 4B) of a screen including an array of microfacets 412, according to various embodiments described herein. The image 501 shows a top down image of the array of microfacets 412, and the image

502 shows a perspective image of the array of microfacets 412 at a higher magnification compared to the image 501. In the illustrated example, each of the microfacets has a generally rectangular or square shape. In the image 501, different levels of shades for different microfacets can be attributed to different microfacet tilt angles.

Figure 6:
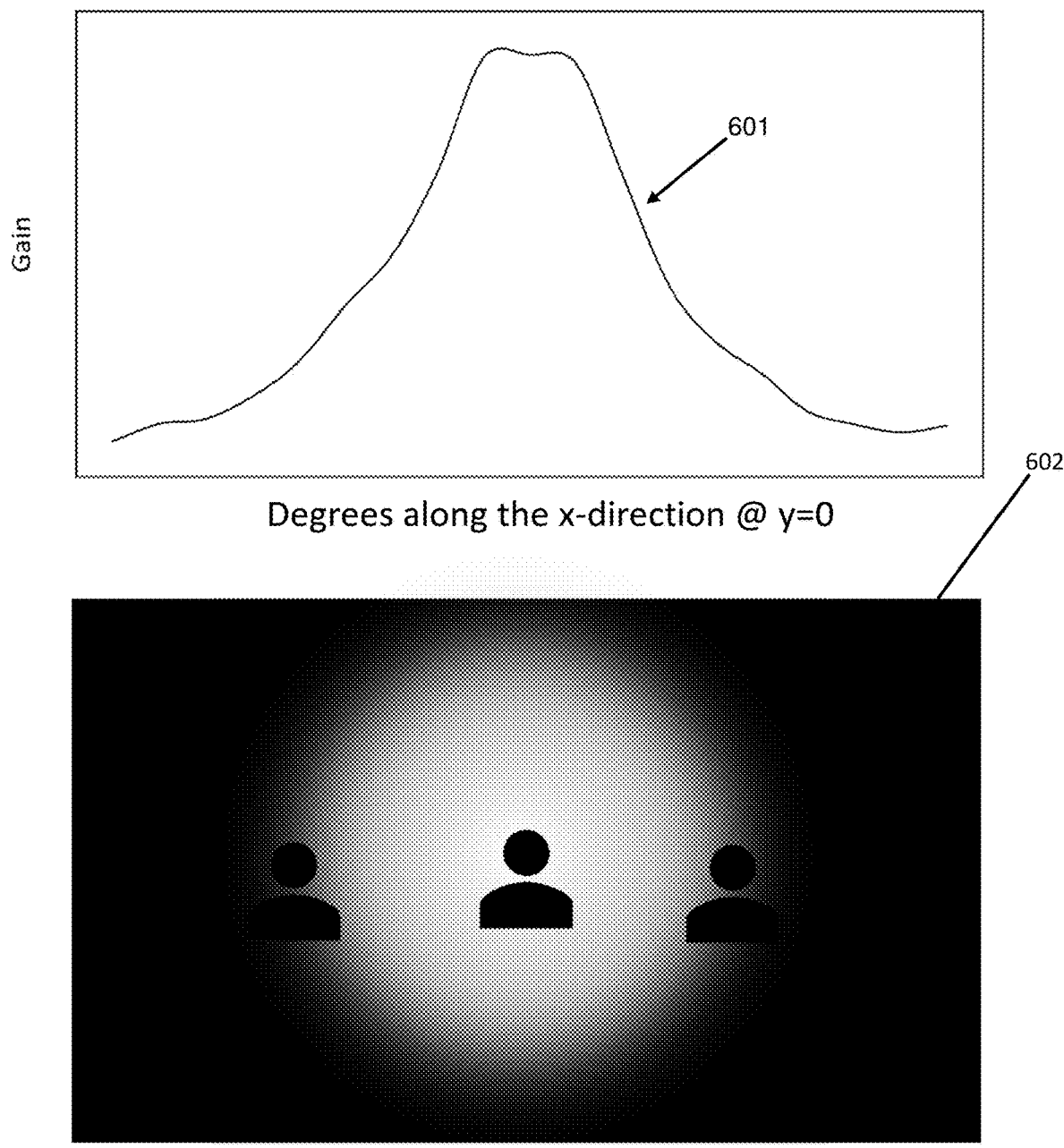
FIG. 6 shows a measured gain profile and a corresponding viewing window profile of a Fresnel-based UST reflective display using a symmetric front-side diffuser, according to a comparative example.

Microfacet Orientation Engineering for Customized Viewing Window Shape and Brightness Uniformity FIG. 6 shows an example measured gain profile and a corresponding intensity profile from a Fresnel-based UST reflective display using a symmetric front-side diffuser, according to a comparative example. The UST reflective display can be similar to that described above with respect to FIG. 2. A measured gain profile 601 shows a representative brightness gain profile (y-axis) as a function of a horizontal angle in the horizontal direction (left-right when facing the reflective display). The horizontal angle may be similar to an angle defined by a cone that defines a viewing window, as described above with respect to FIGS. 4A-4C. In the measured gain profile 601, a classic near-Gaussian profile in brightness is observed. The viewing experience for users of this type of screen may be that a relatively bright image may be viewed by viewers that are closer to a surface normal from a geometric center, while a significant and relatively rapid fall-off in brightness may occur outside of this region. The intensity profile 602 shows a 2-dimensional representation of an intensity profile for this type of screen. Because a radially symmetric diffuser is used, the viewing window may have a substantially circular shape. For illustrative purposes, locations of three viewers at a viewing plane and a viewing distance are superimposed in the intensity profile 602 showing left and right viewers that are located in regions of rapid intensity fall-off. In addition to a viewing window that may be smaller than desired as described, because of the relatively Gaussian profile, the uniformity of intensity within the viewing window is also relatively poor. Furthermore, because of the symmetric diffuser used in this type of screen, a significant amount of reflected light is directed to regions within the viewing plane that are too high and/or too low in the vertical direction where viewers are not expected to be present, resulting in inefficient use of the reflected light for display purposes. Various embodiments disclosed herein address these and other shortcomings of some reflective displays, including UST reflective displays.

Figure 7:
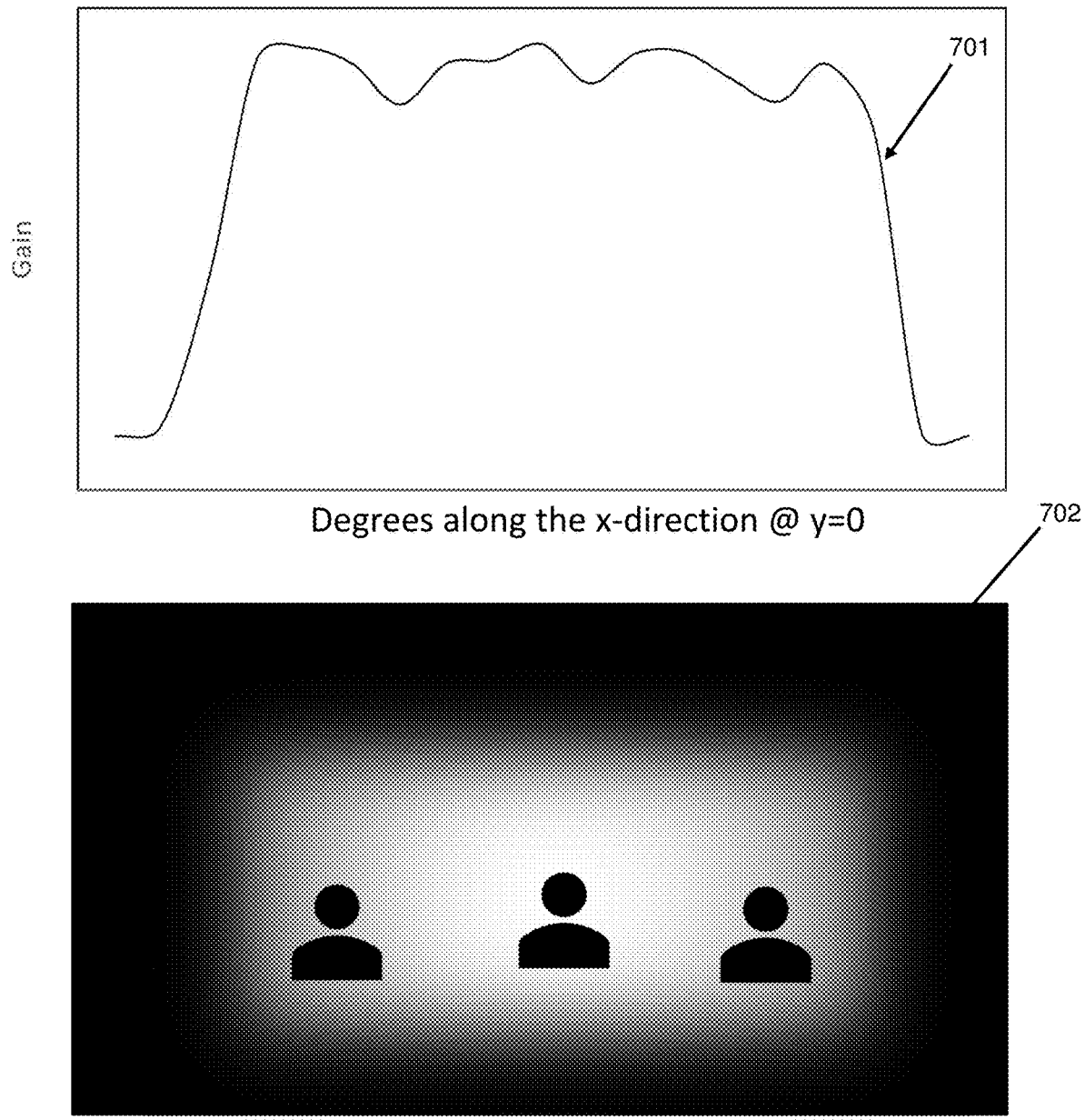
FIG. 7 shows a measured gain profile and a corresponding viewing window profile of a microfacet-based UST microfacet-based reflective display, according to embodiments.

FIG. 7 shows an example of a measured gain profile and a corresponding viewing window profile of a microfacet-based reflective screen, according to embodiments. A measured gain profile 701 shows a representative brightness gain profile (y-axis) as a function of horizontal angle in the horizontal direction (left-right when facing the microfacet-based reflective display). The horizontal angle may be an angle defined by a cone that defines a viewing window, as described above with respect to FIGS. 4A-4C. In the measured gain profile 701, unlike a Gaussian profile of FIG. 6, a relatively flat, a plateau-shaped brightness profile is observed. The viewing experience for users of this type of screen may be that a bright image having a relatively constant intensity may be viewed by more viewers over a broad range of horizontal angles defining a viewing window. The intensity profile 702 shows a 2-dimensional representation of an intensity profile for this type of screen according to embodiments. By orienting the microfacets of the reflective screen according to embodiments described herein, the viewing window may have a customized shape. The customized shape can have a suitable shape, such as a polygonal, elliptical or circular shape. The customized shape can be elongated in a lateral direction, e.g., to accommodate locations of viewer(s). For example, the customized shape can have a ratio of lateral dimensions in two orthogonal lateral directions, e.g., horizontal and vertical directions, which exceeds 1, 2, 3, 4, 5 or have a value in a range defined by any of these values. In the illustrated example, the viewing window substantially forms a general rectangular shape that is elongated in the horizontal direction. For illustrative purposes, locations of three viewers at a viewing plane and viewing distance are superimposed in the intensity profile 702, showing left and right viewers that are now well inside the bright viewing window. In addition to a viewing window that may be relatively large, because of the relatively constant rectangular profile, the uniformity of intensity within the viewing window is also relatively constant. The plateau-shape can be achieved by algorithmically mapping microfacet locations with microfacet orientations such that a certain region in the viewing window is covered with a specifically desired uniformity profile. According to various embodiments, the intensity of reflected light within the viewing window can vary by less than 50%, 40%, 30%, 20%, 10%, 5% or a percentage in a range defined by any of these values, relative to an average intensity within the viewing window. In addition, the intensity fall-off at the edges of the viewing window can be relatively abrupt. For example, the intensity can fall off in a lateral direction by more than 30%, 50%, 70%, 90% or a value in a range defined by any of these values, within a lateral dimension corresponding to less than 30%, 20%, 10%, 5%, or a value in a range defined by any of these values.

Referring back to FIGS. 4A-4C, according to some embodiments, at least some of the microfacets 412 within at least some of the portions 408P1 (FIG. 4B), 408P2 (FIG. 4C), which can be screen pixels or blocks, reflect light rays to cross a randomly assigned one of the non-overlapping regions of the viewing window. By way of example only, a very simplistic illustrative algorithm to map microfacet locations with corresponding microfacet angles may include the following steps. First, for each microfacet location on the microfacet-based reflective display, a random location within a viewing window may be assigned. As an example, for a 2200 mm×1240 mm screen that is closely packed or divided into 20×20 µm² microfacets, the number of microfacets can be as large as 110,000×62,000=6.92 billion microfacets. For an illustrative viewing window that is 4 meters wide×1.5 meters tall, each of the 6.92 billion microfacets may be assigned a random location within the viewing window. Second, for a microfacet assigned to a random location within the viewing window, a corresponding microfacet orientation may be calculated such that a light ray coming from a light source that is incident at a given location corresponding microfacet, which may undergo refraction and reflection due to various optical layers that may be disposed on the reflective screen. Thus a reflected light ray is reflected into the viewing window at the corresponding randomly chosen location. This process is repeated for each microfacet of the screen. Thus calculated microfacet orientation can be stored and accumulated for manufacturing. While this basic implementation can work to produce an acceptable viewing window similar to that illustrated in FIG. 7, the microfacet orientation methodology can be further refined to reduce artifacts and unintended non-uniformities, for improved and customized user visual experience, as described below.

Figure 8:
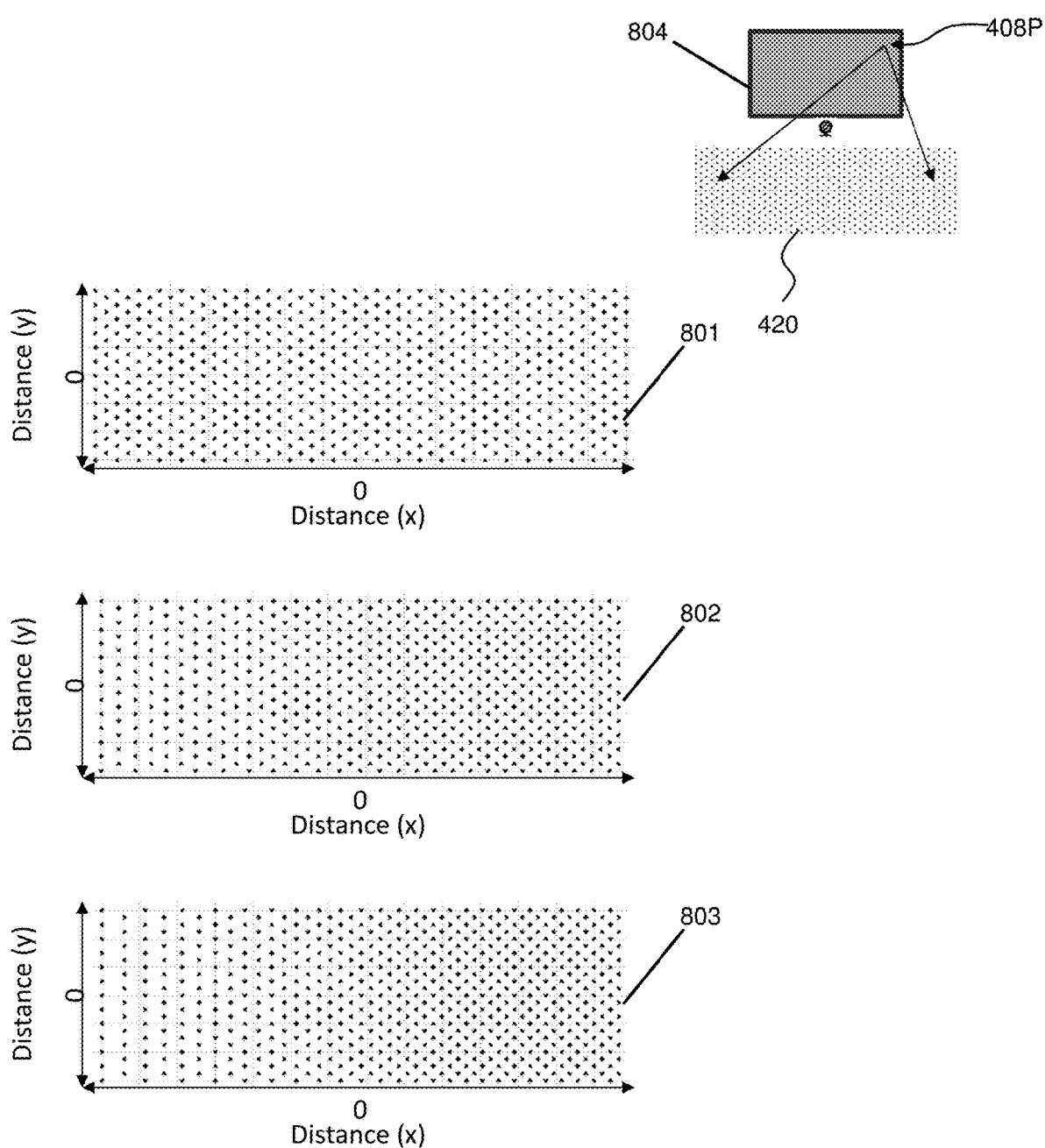
FIG. 8 illustrates example schemes of assignment of microfacets to corresponding locations within a viewing window to achieve relatively uniform intensity profiles within the viewing window, according to embodiments.

FIG. 8 illustrates example approaches of assignment of microfacets to corresponding locations within a viewing window to achieve relatively uniform intensity profiles within the viewing window, according to embodiments. In particular, three example schemes of distributing reflected light within a viewing window 420 from a given region of the microfacet-based reflective display 804, e.g., a portion 408P, which can include a pixel or a block located at an upper right region of the microfacet-based reflective display 804, are illustrated. The microfacet-based reflective display 804 is configured to reflect incident light into a viewing window. The three example schemes are designed to produce corresponding distributions 801, 802 and 803 of reflected light within the viewing window. In each of the distributions 801, 802 and 803, each black dot represents a specific location within the viewing window that is targeted by the microfacet angles described above. It should be understood that a specific location in the viewing window, while it may be represented by a single black dot, may not be receiving the entirety of the light that is targeted by a corresponding microfacet. Rather, due to an inherent spread in the light intensity that may exist, a smooth light intensity variation within the viewing window may be achieved, including areas between the shown black dots. The example distribution 801 shows a representative viewing window distribution wherein the microfacets 412 of a given portion 408P may be assigned to reflect light onto the viewing window 420 that is divided into non-overlapping regions 428 (FIG. 4A) having the same area. The reflected light is distributed across the viewing window 420 such that the return flux of light to viewers is constant across the viewing window 420 on a per area basis. That is, the example distribution 801 represents an engineered light distribution where the number of photons, coming from a uniform and still test image, crossing the viewing window 420 per unit area per unit time is constant across at least a portion, e.g., 60%, 70%, 80%, 90%, 99% or a percentage in a range defined by any of these values, of the viewing window 420. This is represented by the constant density of black dots across the viewing window 420. The example distribution 802 shows a representative viewing window distribution wherein the microfacets 412 of a given portion 408P may be assigned to reflect light onto the viewing window 420 that is divided into non-overlapping regions 428 (FIG. 4A) having different areas. The reflected light is distributed across the viewing window 420 such that the return flux of light to viewers is constant across the viewing window on a per solid angle basis. That is, the example distribution 801 represents an engineered light distribution where for a uniform still image being displayed the average number of photons crossing the viewing window per unit solid angle is constant across at least a portion, e.g., 60%, 70%, 80%, 90%, 99% or a percentage in a range defined by any of these values, of the viewing window 420. In this case, since the left side of the viewing window is further from the screen location in question, the spacing between black dots is adjusted to be larger for the left side of the viewing window in order to match the density of photons per angular spread seen on the right side of the viewing window. The example distribution 803 shows another representative viewing window distribution wherein the microfacets 412 of a given portion 408P may be assigned to reflect light onto the viewing window 420 that is divided into non-overlapping regions 428 (FIG. 4A) having different areas. The reflected light is distributed such that the return flux of light to viewers is emulating a natural (or Lambertian) distribution of brightness across the viewing window 420 as viewed from an off-center location inside the viewing window. As described herein, Lambertian reflectance refers to a property that defines an ideal "matte" or diffusely reflecting surface. The apparent brightness of a Lambertian surface to an observer is substantially the same regardless of the observer's angle of view. In other words, the surface's luminance is isotropic, and the luminous intensity obeys Lambert's cosine law. That is, the example distribution 803 represents an engineered light distribution where the number of photons crossing the viewing window 420 is Lambertian across at least a portion, e.g., 60%, 70%, 80%, 90%, 99% or a percentage in a range defined by any of these values, of the viewing window 420. In this case, since the left side of the viewing window has a larger angle relative to the normal vector to the screen location in question as compared to the right side of the viewing window, the spacing between black dots is adjusted to be larger for the left side of the viewing window in order to maintain a Lambertian distribution for photons reflecting from the screen 804.

Microfacet Orientation Engineering for Reduction of Visual Nonuniformities

Figure 9:
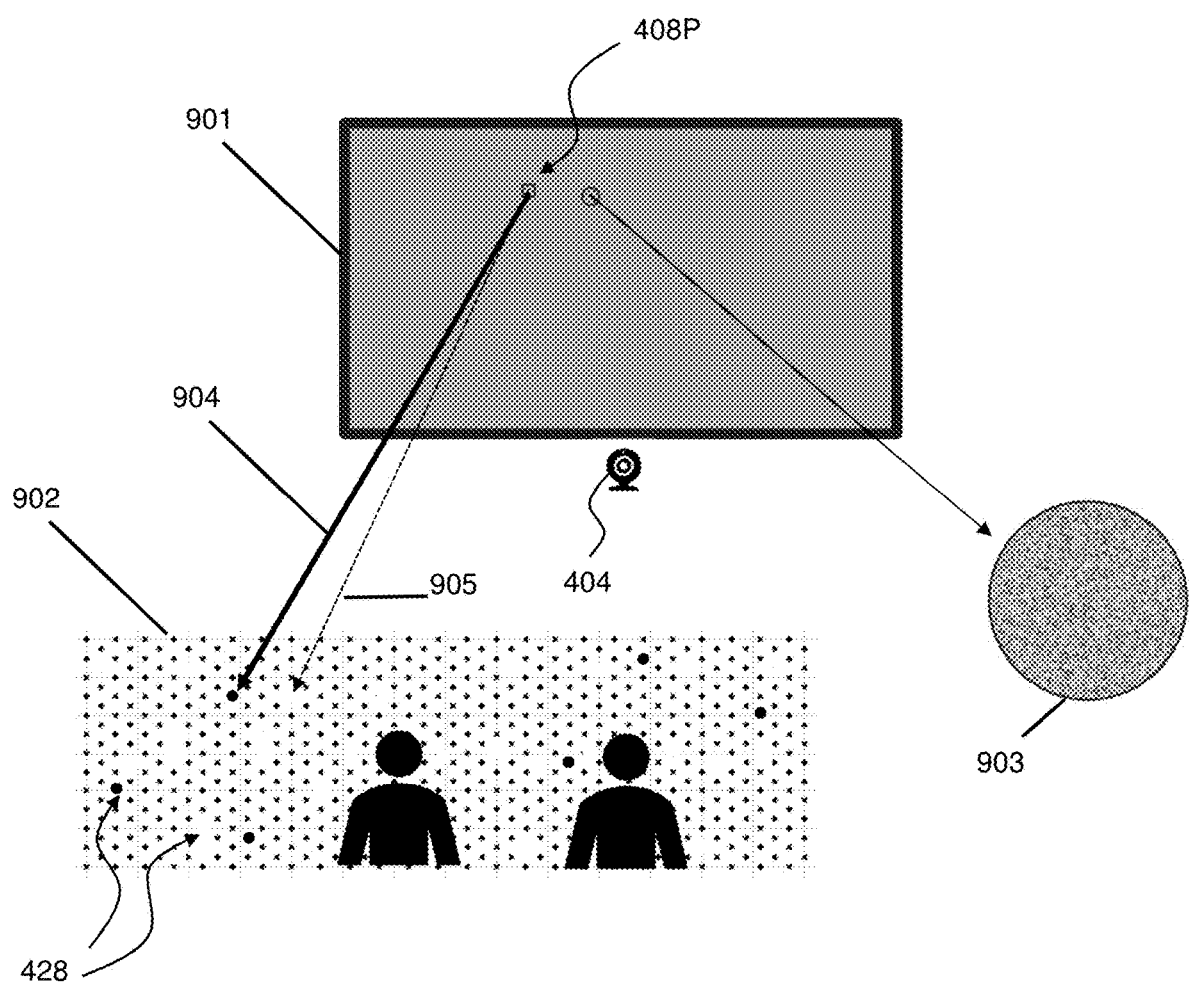
FIG. 9 illustrates a microfacet-based reflective display configured to distribute light rays within a viewing window by arranging the microfacets for enhanced intensity uniformity, wherein the distribution of points within a viewing window crossed by light rays from a projector is randomly chosen for all microfacets, according to embodiments.

FIG. 9 illustrates a microfacet-based reflective display configured to distribute light rays within a viewing window by arranging the microfacets for enhanced intensity uniformity, according to some embodiments. In the following, unless otherwise indicated, a projector 404 is located below the center of a bottom edge of the microfacet-based reflective display. As described above, microfacet-based reflective displays according to embodiments include a portion 408P having at least a subset of the plurality of microfacets that are oriented such that a light ray reflected from each microfacet of the portion 408P crosses a randomly selected location within the viewing window. The illustrated example shows a resulting viewing window 902 generated by the microfacet-based reflective display 901, e.g., UST microfacet-based reflective display, where the distribution of points within a viewing window 902 crossed by light rays from the portion 408P, which can be a pixel or a block, is randomly chosen for all microfacets within the portion 408P, according to embodiments. Similar to FIG. 8, each black dot represents a specific location or non-overlapping viewing window regions 428 within the viewing window 902 that is crossed by a light ray from a microfacet of the microfacet-based reflective display 901. Using a suitable algorithm similar to that described above with respect to FIG. 7 for determining the microfacet angles of the microfacets, a significant improvement in the uniformity of the intensity profile may be achieved compared to, e.g., a Gaussian profile. However, when the microfacet angles are purely randomly assigned, some viewing quality issues can arise where, due to probabilistic chance, some non-overlapping viewing window regions 428 in the viewing window 902 may receive a greater level of flux from a given resolvable portion 408P of the microfacet-based reflective display 901 (indicated by a return light path 904 and a corresponding larger black dot in the vicinity of the end-point of a reflected light path 904), while some other locations in the viewing window may receive a lower level of flux from another given resolvable region of the screen (indicated by a second reflected light path 905 and a region in which a black dot is omitted in the vicinity of the end-point of the second reflected light path 905). As illustrated, under some circumstances, if the viewing window distribution is non-uniform for a given location on the screen and if this non-uniformity is random over screen locations, the result may be that for a given viewing window location, there may be perceived non-uniformity on the screen as illustrated by an example screen location 903. The image in the screen location 903 shows visual nonuniformities and graininess in screen brightness that can be perceived by viewers if the allocation and distribution of light rays within the viewing window is random.

In the following, microfacet-based reflective display configurations for enhanced intensity uniformity and customized intensity profiles within a viewing window are described, in which the microfacets are arranged into a plurality of portions such as pixels blocks to reduce the visual nonuniformities that can result from such unrestrained randomness.

According to various embodiments, different portions such as pixels or blocks have different average microfacet angles, where average microfacet angles are formed by a general normal direction of a major surface of the microfacet-based reflective display and local normal directions of the respective microfacets within respective blocks.

Figure 10:
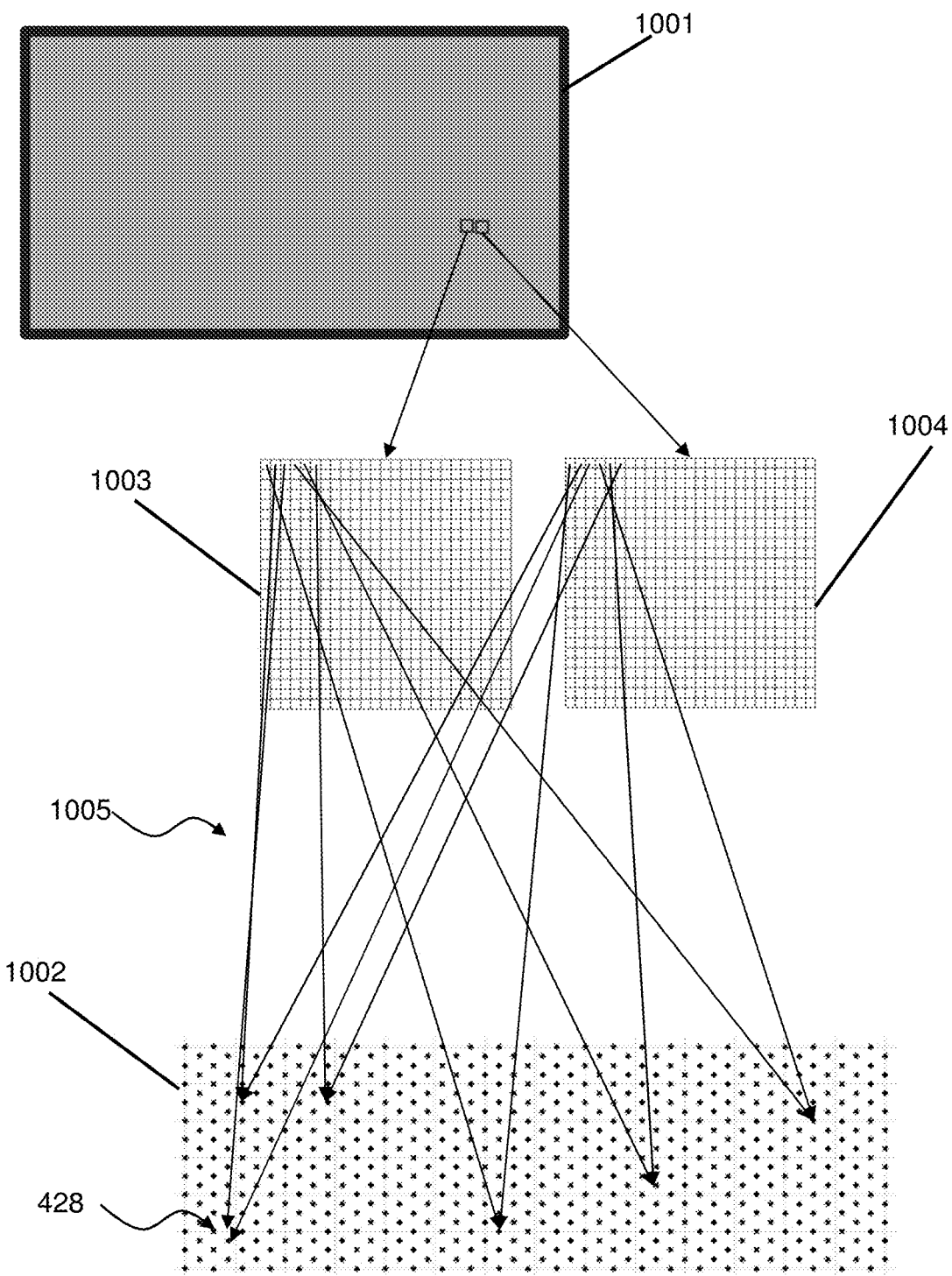
FIG. 10 illustrates a microfacet-based reflective display configured to distribute light rays within a viewing window by arranging the microfacets into a plurality of light-reflective portions, which can be pixels or blocks, for enhanced intensity uniformity, according to some embodiments.

FIG. 10 is illustrates a microfacet-based reflective display configured to distribute light rays within a viewing window by arranging the microfacets into a plurality of portions, e.g., pixels or blocks for enhanced intensity uniformity and visual nonuniformity reduction, according to embodiments. In the illustrated embodiment, a microfacet-based reflective display 1001 is arranged into a plurality of portions, which can be pixels or blocks each having an equal number of microfacets. At least two portions 1003, 1004, which can be pixels or blocks, e.g., adjacent pair of portions, are configured such that one or more corresponding pair(s) of microfacets (e.g., having the corresponding column and row combinations as described above with respect to FIGS. 4B and 4C) of the pair of portions 1003, 1004 is configured to reflect light from the projector towards the same location or non-overlapping viewing window regions 428 within the viewing window 1002. Using an alternative algorithm, the distribution of light rays within the viewing window 1002 is adjusted to be more uniform compared to a distribution of light rays resulting from random assignment of microfacets to points within the viewing window such as that as described above with respect to FIG. 9. The illustrated viewing window 1002 can have intensity uniformity in the x-y direction similar to the example distribution 801 (FIG. 8). However, the methodology described herein can also apply to other viewing window distributions, such as the example distributions 802 and 803 (FIG. 8). The illustrated methodology includes dividing the microfacet-based display 1001 into a plurality of portions such as the portions 408P (FIG. 4A), which can be pixels or blocks. The portions 1003 and 1004 may represent different portions, e.g., adjacent ones of portions 408P, of the microfacet-based display 1001 each having 25×25 (625) microfacets. According to an embodiment, a method that can achieve higher level of uniformity of distribution of light rays within the viewing window 1002 includes subdividing the viewing window 1002 into a predetermined number of portions 408P and forcing at least some of the portions 408 such as the illustrated portions 1003, 1004 containing a matched number of microfacets to have microfacets having orientations such that within each of the portions 1003, 1004, each microfacet is orientated to have the resulting reflected light ray match a unique location or non-overlapping viewing window region 428 within the viewing window 1002. The microfacets can be oriented to prevent repeats and to avoid substantial gaps for a given portion. In the illustrated example, 625 microfacets of each portion 408P corresponds to 625 locations or non-overlapping viewing window regions 428 within the viewing window. However, the specific number of microfacets and viewing window locations may be varied. This can be achieved by a suitable computational means according to embodiments. For example, for each microfacet in a given portion 1003 of the microfacet-based display 1001, the microfacet angle can be determined by a random selection from a population of viewing window locations or non-overlapping viewing window regions 428, in a similar manner as described above with respect to FIG. 9. However, unlike the random assignment of non-overlapping viewing window regions 428 as described with respect to FIG. 9, the illustrated example in FIG. 10 can additionally include removal of each viewing window location from allowed locations upon selection to prevent repeats. Alternatively, the viewing window locations or non-overlapping viewing window regions 428 can be shuffled randomly and then applied sequentially to each microfacet within the block of microfacets. In addition, different portions, e.g., adjacent portions 1003, 1004, can have corresponding microfacets (e.g., having the corresponding column and row combinations as described above with respect to FIGS. 4B and 4C) that are oriented to be directed to substantially the same location or the same non-overlapping viewing window region 428 within the viewing window 1002. This is schematically represented in FIG. 10, in which the portions 1003 and 1004 have corresponding 6 pairs of microfacets in the first rows, where each pair directs light to the same location or the same non-overlapping viewing window region 428 within the viewing window 1002. This is illustrated in FIG. 10 by return light paths 1005 pointing to the same viewing window region 48. An advantage with this approach includes a significant reduction in the perceived graininess due to viewing window non-uniformities.

Figure 11:
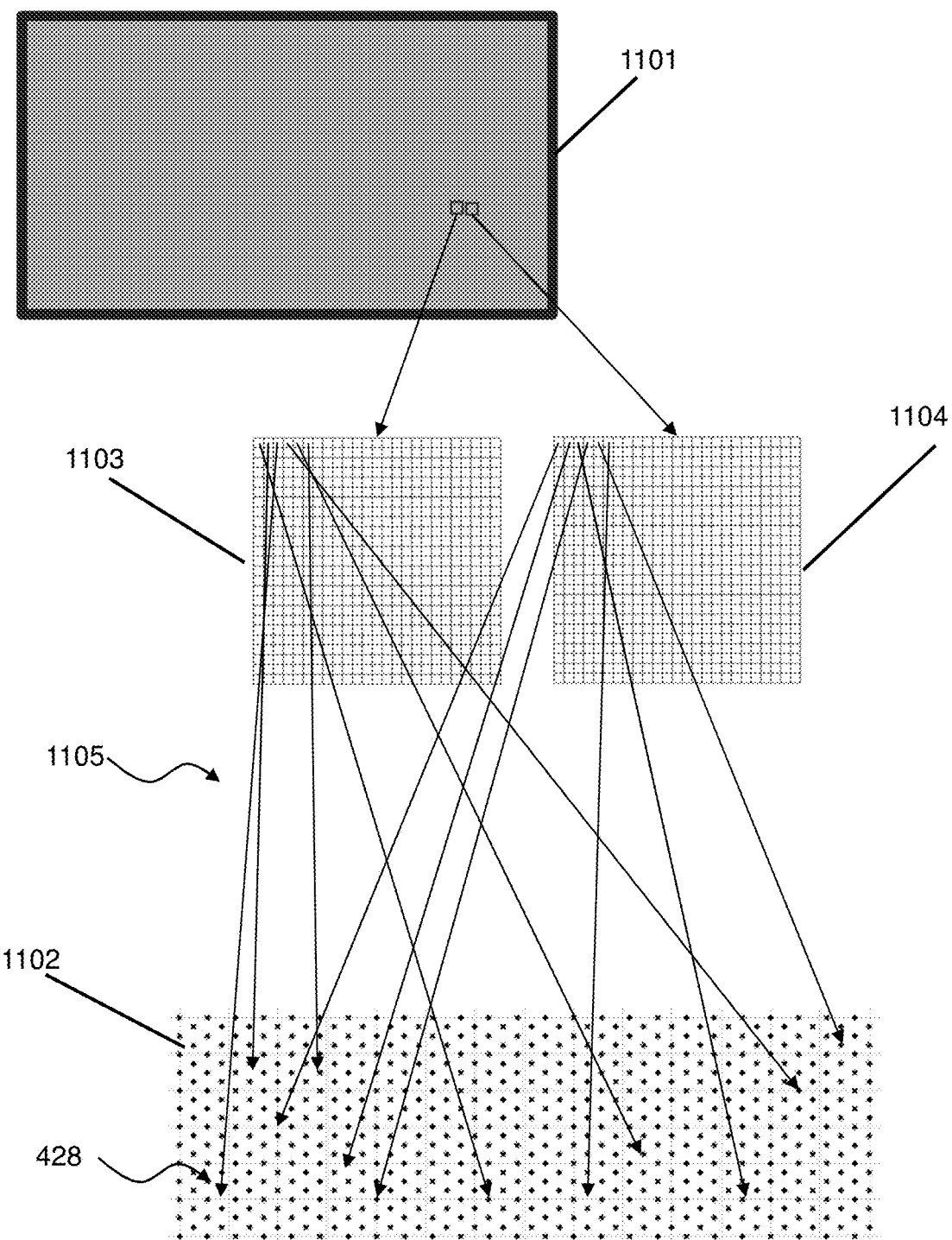
FIG. 11 illustrates a microfacet-based reflective display configured to distribute light rays within a viewing window by arranging the microfacets into a plurality of portions, which can be pixels or blocks, for enhanced intensity uniformity, according to some other embodiments.

FIG. 11 is a schematic illustration of a microfacet-based reflective display configured to distribute light rays within a viewing window by arranging the microfacets into a plurality of portions, e.g., pixels or blocks for enhanced intensity uniformity and visual nonuniformity reduction, according to some other embodiments. The dimensions and lateral arrangement of the portions 408P (FIG. 4A), which can be pixels or blocks, and microfacets therein are similar to those described above with respect to FIG. 10, including, e.g., the number of microfacets per portion 408P. However, unlike the microfacet-based reflective display 1001 illustrated above with respect to FIG. 10 in which adjacent portions 408P have corresponding microfacets oriented to be directed to substantially the same location or the same non-overlapping viewing window region 428 within the viewing window 1002, FIG. 11 shows an alternative approach for viewing window and optimization of the microfacets of different portions 408P, which can further improve the viewing experience by reducing repeating grid-like patterns that may be observable on the screen under some circumstances. Unlike the embodiment described above with respect to FIG. 10, in the illustrated embodiment of FIG. 11, at least two portions 1103, 1104, e.g., adjacent pair of portions, are configured such that one or more corresponding pair(s) of microfacets (e.g., having the corresponding column and row combinations as described above with respect to FIGS. 4B and 4C) of the portions 1103, 1104 is configured to reflect light from the projector towards different locations or non-overlapping viewing window regions 428 within the viewing window 1102. In the illustrated block arrangement illustrated in FIG. 11, different portions 1103, 1104, e.g., adjacent portions 1103 and 1104 have microfacet orientations such that within a given portion, each microfacet has a microfacet angle such that the resulting light ray maps to a unique location or non-overlapping viewing window regions 428 within the viewing window 1102 with no repeats and no gaps for the given screen block. In this arrangement, different portions 1103, 1104, e.g., adjacent portions 1103, 1104, can have corresponding microfacets having different mapping locations within the viewing window 1102. As a result, the illustrated arrows representing return light paths 1105 from corresponding pairs of microfacets from different portions 1103, 1104, e.g., adjacent blocks 1103, 1104, terminate at different locations or non-overlapping viewing window regions 428 within the viewing window 1102. This is in contrast to FIG. 10, where the arrows from corresponding pairs of microfacets from some different portions, e.g., adjacent portions 1003, 1004 (FIG. 10), terminate at the same locations or non-overlapping viewing window regions 428 within viewing window 1002 (FIG. 10). This illustrated approach in FIG. 11 can advantageously further reduce or essentially eliminate the repeating block visual artifact.

Figure 12:
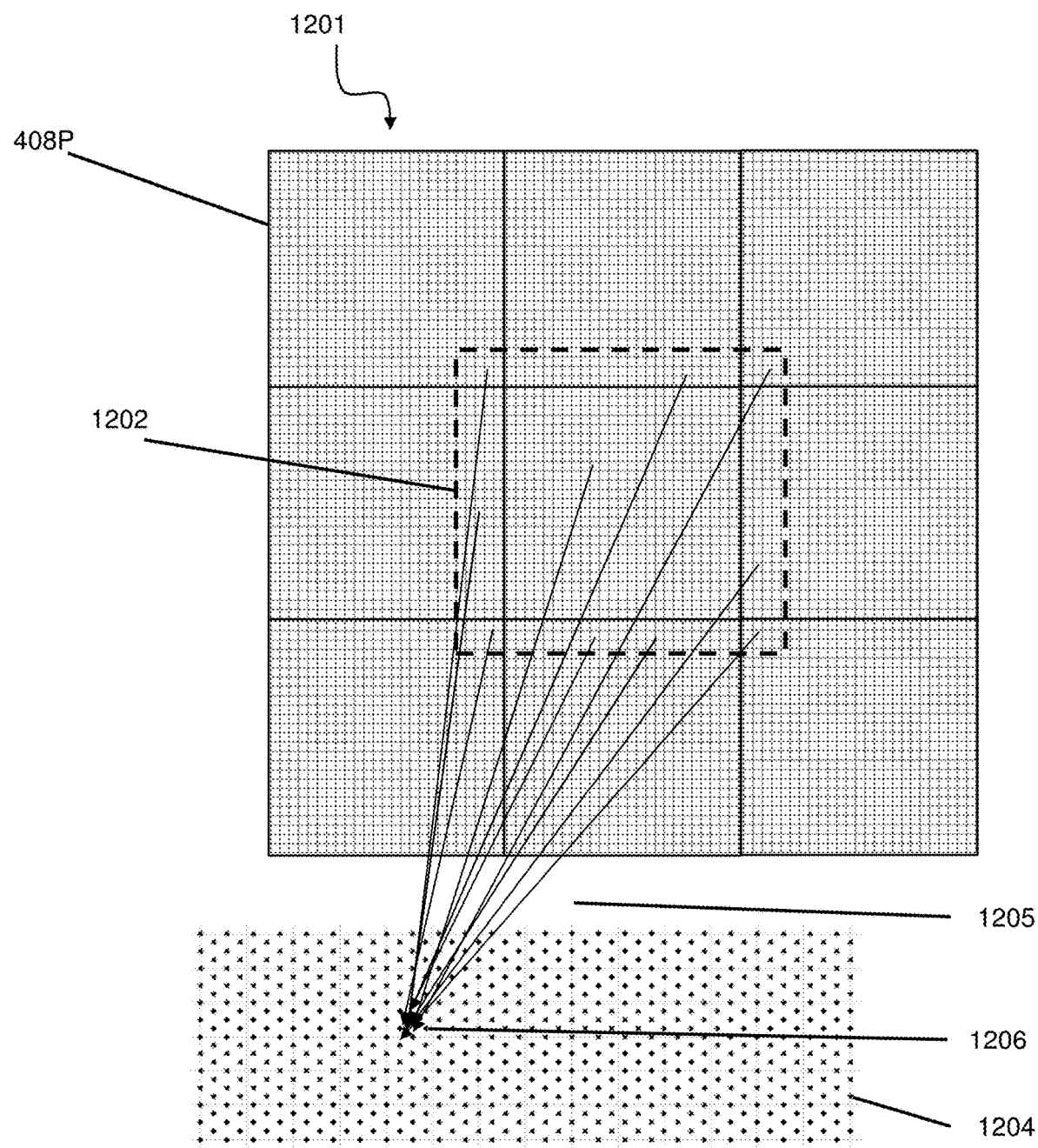
FIG. 12 illustrates a possible cause of some observed screen graininess.

The inventors have discovered that, even when microfacet arrangement methodologies such as those described above with respect to FIGS. 10 and 11 are employed, under some circumstances, some visual nonuniformities residual graininess may still be observed. Without limitation as to the cause of such visual nonuniformities or graininess, FIG. 12 describes a possible cause of the graininess. FIG. 12 illustrates part of a microfacet-based reflective display 1201 including 9 continuous portions 408P thereof. The dimensions and lateral arrangement of the portions, which can be pixels or blocks, and microfacets therein are similar to those described above with respect to FIG. 10, including, e.g., the number of microfacets per block. The interfaces between the adjacent portions 408 are illustrated with darker lines for illustrative purposes only, to more easily visualize the individual blocks. For illustrative purposes only, a resolvable portion 1202 enclosed by dashed lines may represent an area of the microfacet-based reflective display 1201 that might be visually resolvable within a viewing window 1204 by a viewer at a viewing distance. For example, if each microfacet is 20 μm×20 μm in size, then each pixel or block including 25×25 microfacets can be roughly 0.5 mm×0.5 mm in size, so the resolvable portion 1202 would be 0.7 mm×0.7 mm in size. This is a size on the screen that could be resolved by a viewer from a viewing distance of, e.g., 1-3 meters. The illustrated configuration shows an example situation in which a specific location 1206, which can be a non-overlapping viewing window regions 428 (FIG. 4A) within the viewing window 1204, is crossed by return light paths 2005 corresponding to at least one microfacet in each of the 9 portions 408P within the part 1202 of the microfacet-based reflective display 1201. As illustrated, each of the 9 portions 408P has microfacets within the resolvable portion 1202, which may be near the limit of what is resolvable to the viewer at the particular viewing distance. The illustrated circumstance can cause the resolvable portion 1202 of the microfacet-based reflective display 1201 to appear significantly brighter than adjacent regions. The inventors have realized that, while the illustrated circumstance may not occur with the arrangement shown in FIG. 10, it may occur with the arrangement shown in FIG. 11, which constrains the portions 408P to distribute light uniformly within the viewing window, if adjacent portions 408P are not prevented from coincidentally over-sampling or under-sampling the portions 408P in the viewing window 1204 when resolvable regions larger than one portion 408P are viewed.

Figure 13:
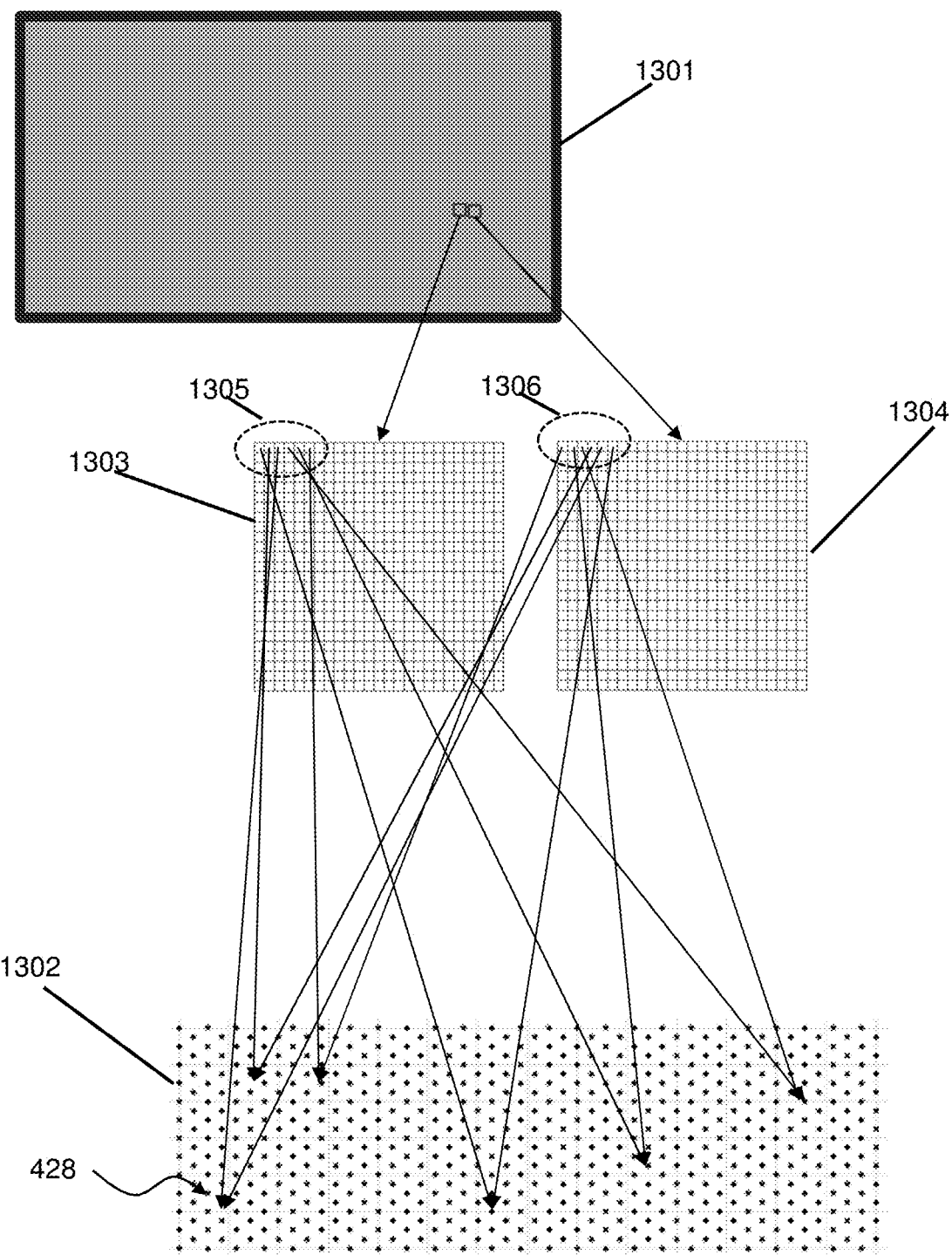
FIG. 13 illustrates a microfacet-based reflective display configured to distribute light rays within a viewing window by arranging the microfacets into a plurality of portions, which can be pixels or blocks, for enhanced intensity uniformity, according to some other embodiments.

FIG. 13 is a schematic illustration of a microfacet-based reflective display configured to distribute light rays within a viewing window by arranging the microfacets into a plurality of portions, e.g., pixels or blocks for enhanced intensity uniformity and nonuniformity reduction, according to some other embodiments. In particular, FIG. 13 shows a method to uniformly distribute the light rays within the viewing window, while simultaneously addressing both screen graininess and repeating block patterns, which can be caused by the effect described above with respect to FIG. 12. Unlike the configurations described above with respect to FIGS. 10 and 11, at least two portions 1303, 1304, e.g., adjacent portions, are configured such that a non-corresponding pair of microfacets (e.g., having different column and row combinations as described above with respect to FIGS. 4B and 4C) of the portions 1303, 1304 is configured to reflect light from the projector towards same location or the same non-overlapping viewing window regions 428 within the viewing window 1302. The dimensions and lateral arrangement of the portions and microfacets therein are similar to those described above with respect to FIG. 10, including, e.g., the number of microfacets per portion. In the illustrated configuration of the microfacet-based reflective display 1301, different portions 1303, 1304, e.g., adjacent portions and the viewing window 1302 are arranged similarly to the configuration shown in FIG. 10 in some respects. However, a key difference is illustrated by microfacets arranged in circled regions 1305 and 1306 of the portions 1302, 1304, respectively. For illustrative purposes, the regions 1305 and 1306 have corresponding 6 pairs of microfacets in the first rows. Similar to the configuration shown in FIG. 10, six representative locations of each of the adjacent screen blocks 1303 and 1304 direct light to six corresponding locations within the viewing window 1302. However, unlike the configuration shown in FIG. 10, where corresponding pairs of microfacets direct light to the same locations or non-overlapping viewing window regions 428 within the viewing window 1302, in the illustrated configuration, there is not a one-to-one match between the return light paths 1305 of corresponding microfacets in of the portions 1303, 1304. For example, the leftmost microfacet within the top row of microfacets in the portion 1303 directs light to a location near the bottom middle of the viewing window 1302, while the corresponding leftmost microfacet within the top row of microfacets in the in portion 1304 directs light to a location near the top left of the viewing window 1302. By constraining sub-divided regions within each portion to map to the same viewing window locations or non-overlapping viewing window regions 428 while forcing random assignment between different portions in this manner, both screen graininess and repeating block defects can be avoided.

Thus, in various embodiments as described above with respect to FIGS. 9, 10, 11 and 13, different portions 408P (FIG. 4A) of a microfacet-based reflective display, e.g., different pixels or blocks of the microfacet-based reflective display, can be engineered to reflect light onto a common shared viewing window. However, embodiments are not so limited. In some other embodiments, different regions or different blocks of a microfacet-based reflective display can be engineered to reflect light onto different respective sub-viewing windows, where different respective viewing sub-windows can be different in size and/or location within a viewing plane, as described below. In these embodiments, the overlaid combination of the viewing sub-windows can be collectively referred to as a viewing window.

Figure 14:
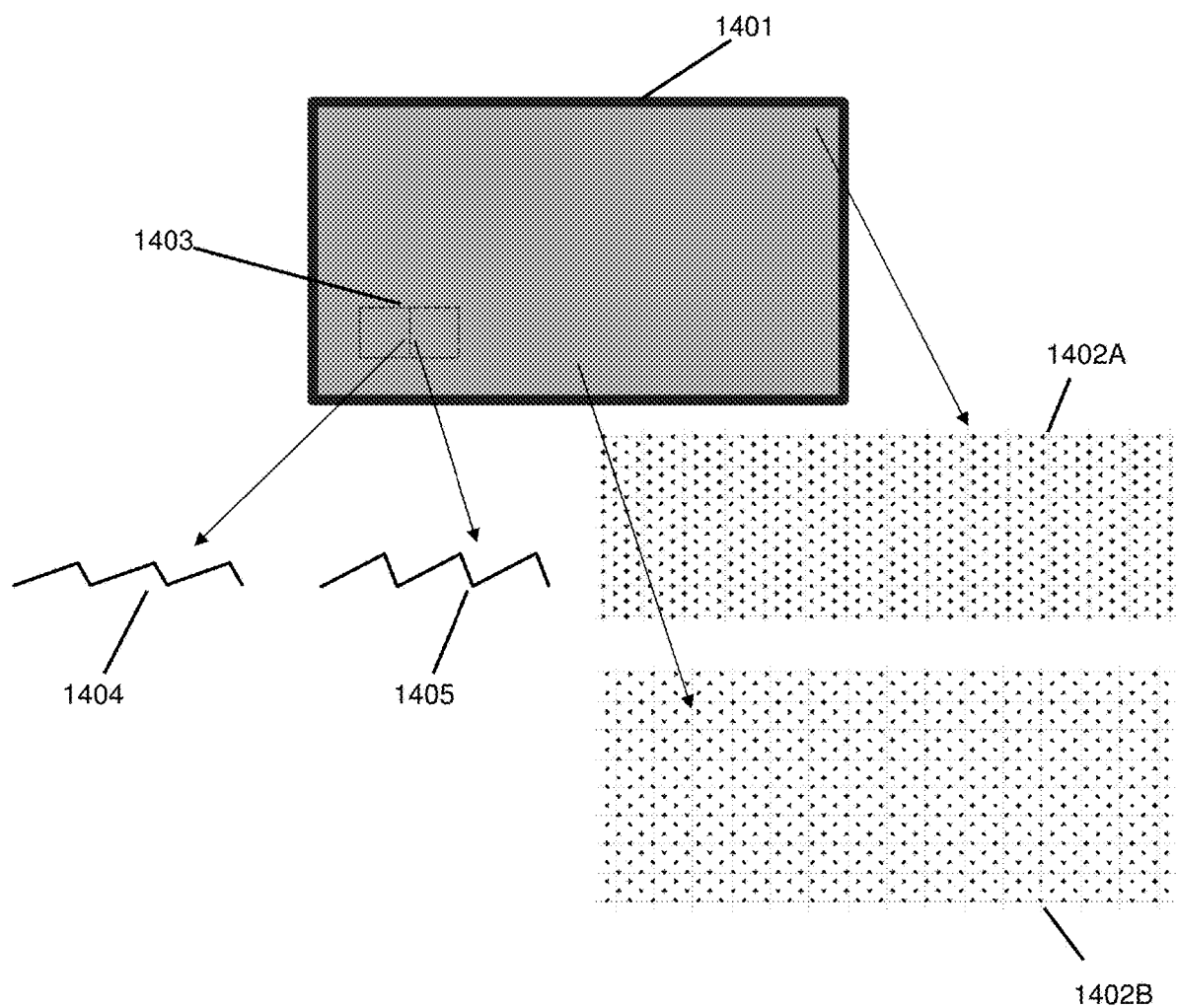
FIG. 14 illustrates optimization of viewing sub-windows to accommodate for different locations within a microfacet-based reflective display, according to embodiments.

FIG. 14 shows how the viewing sub-window can be varied as a function of screen location. The projector 404 (not shown) is located below a bottom middle edge of a microfacet-based reflective display 1401. A viewing sub-widow 1402A represents a nominal viewing sub-window corresponding to light reflected from a first region of the microfacet-based reflective display 1401, while a viewing sub-window 1402B represents a viewing sub-window corresponding to light reflected from a second region of the microfacet-based reflective display 1401. In the illustrated example, the viewing sub-window 1402B is significantly taller in the vertical direction compared to the viewing sub-window 1402A. Such configuration may be desired, e.g., due to large viewing sub-window shifts that can occur from light reflected near the bottom-middle of the microfacet-based reflective display 1401, due to project setup and parameter variations. Because of this increase sensitivity in this region of the microfacet-based reflective display, a relatively larger viewing sub-window size corresponding to lower portion of the screen, e.g., lower 30-50% of the screen, may be desired. For example, a viewing sub-window crossed by light reflected from the lower portion of the screen may be increased in size in x, y or both directions by 2%, 5%, 10%, 20%, 30%, 40%, 50% or a value in range defined by any of these values, to ensure the viewing window covers the desired space irrespective of incoming variations. Advantageously, in microfacet-based reflective display configurations in which the arrangement of the microfacet array is already customized with specifically engineered microfacet orientations for each location on the microfacet-based reflective display according to various examples described above, including an algorithm to modulate the viewing window size as a function of screen location can be performed synergistically. In contrast, it will be appreciated that if the viewing window size were to be modulated using a front diffuser with different diffuser strengths and ratios for x and y directions at different screen locations, there would be significant added complexity to both diffuser design as well as diffuser manufacturing.

Still referring to FIG. 14, beyond changing the viewing window size as a function of screen location, microfacet angles may also be changed as a function of screen location on a more local scale. To illustrate, a representative region 1403 of the microfacet-based reflective display 1401 includes tile regions 1404, 1405 corresponding to two adjacent tiles. As described herein, a tile refers to the smallest component unit of a master that can be assembled into a master for manufacturing the microfacet-based reflective displays according to embodiments. In order to maintain a seamless appearance so that the interface between tile regions 1405, 1405 is not visible, the average microfacet angles may be matched at the interface between the two tiles. In the manufacturing process of connecting adjacent tiles, there may be small yet undesirable microfacet angle shifts that may be introduced within a proximity of the interface. For example, a 1-degree shift may be observed for microfacets within 0.5 mm of the interface. If this undesirable angle shift is understood and systematic, the designed microfacet angles maybe modified in order to compensate for the unintentional microfacet angle shift. By way of illustration only, an algorithm may be implemented with a rule such as: within 0.5 mm of left and top edges of a tile, increase the microfacet angle by an correction factor that is 1-degree at the edge of tile and reduce the correction factor linearly to be zero at a distance of 0.5 mm from the edge of the tile.

Figure 15:
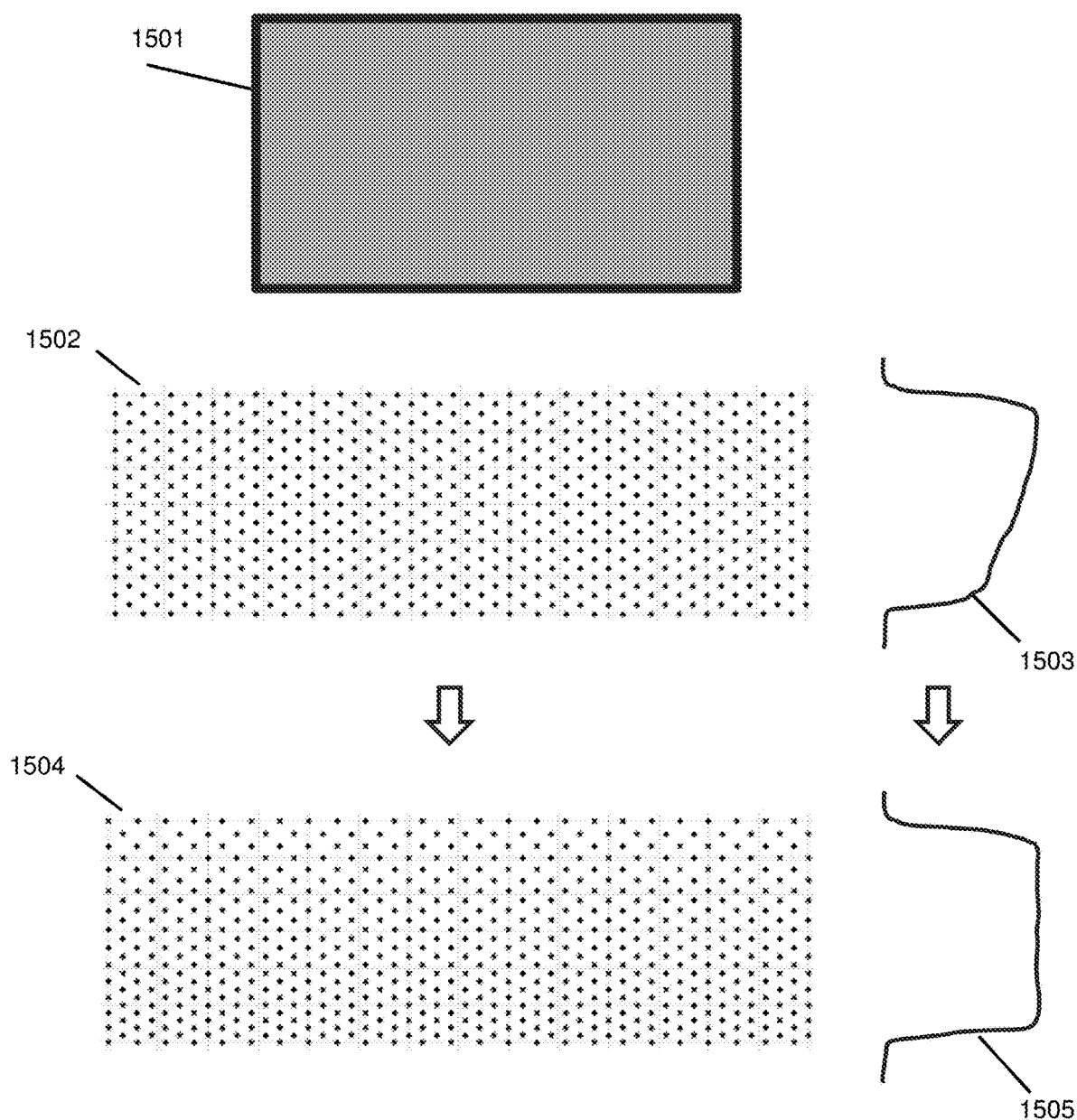
FIG. 15 illustrates a microfacet-based reflective display configured to compensate for non-uniform brightness within a viewing window, according to embodiments.

FIG. 15 illustrates a microfacet-based reflective display configured to compensate for non-uniform brightness within a viewing window, according to embodiments. The illustrated microfacet-based reflective display 1501 has, by way example, a vertical viewing window brightness distribution that is non-uniform, with increasing brightness level towards the top of the viewing window and a decreasing brightness level towards the bottom of the viewing window. The viewing window 1502 is a representative viewing window with uniform point density representing the reflected light distribution resulting from the as-designed goal to have uniform brightness throughout the viewing window 1502, which may correspond to the distribution 801 described above with respect to FIG. 8. The intensity profile 1503 may represent a measured vertical viewing window brightness or intensity distribution, which shows increasing brightness towards the top of the viewing window and decreasing brightness towards the bottom of the viewing window. This type of effect can occur due to, e.g., a range of unintended factors that modulate the light intensity in the viewing window asymmetrically including, but not limited to, such effects as microfacet edge/corner rounding. To accommodate for such brightness variations, the viewing window may be modified to have a reflected light intensity distribution design that is engineered to compensate for downstream factors modulating the desired viewing window uniformity. Non-uniform projector-delivered light intensity can also be compensated in this manner if the projector induced non-uniformity is for the most part repeatable and difficult to compensate otherwise, e.g., due to inherent optical design limitations of UST projectors, where the distances from projector to various target spots on screen vary by large factors relative to each other. In the viewing window 1504, it can be seen that the density of reflected light rays crossing the viewing window 1504 may be designed to be intentionally skewed, e.g., to be higher towards the bottom of the viewing window 1504. The intensity profile 1505 represents a measured vertical viewing window brightness with significantly improved vertical viewing window brightness or intensity uniformity. The increased density of points representing increased intensity towards the bottom portion of the viewing window 1504 can be achieved through a number of means. For example, a method of compensating for an intensity variation within a viewing window includes first providing a microfacet-based reflective display designed to generate a uniform intensity distribution within a viewing window for a given viewing plane, viewing distance and a projector location. The method additionally includes measuring an actual intensity distribution within the viewing window and determining the brightness or intensity variation across one or more lateral directions along the viewing window. For example, in the illustrated example, the determination of the variation is made as a function of a vertical direction, which shows an increase towards the top of the viewing window 1502 and the corresponding intensity profile 1503. The method additionally includes calculating a corresponding compensating brightness or intensity variation across the one or more lateral directions along the viewing window. In the illustrated example, the compensating variation includes proportionally increasing the density of reflected light rays crossing the viewing window, or decreased spacing between rows of points towards the bottom of the viewing window 1504 and the corresponding intensity profile 1505, such that the nonuniformity in brightness or intensity is compensated.

Microfacet-Based Reflective Display Manufacturing

Microfacet-based reflective displays according various embodiments disclosed herein can be manufactured using one of various suitable methods. In some manufacturing methods, including imprinting and molding processes, a master template may be used as a template mold for manufacturing. However, manufacturing masters for microfacet-based reflective displays can be difficult and expensive due to various technical issue described above. For example, different screens configured for different projector locations and/or having different sizes may have different microfacet orientations at different locations. However, it may be expensive to recreate a master from scratch for each configuration. Thus, there is a need for a versatile manufacturing approach for a master for fabricating microfacet-based reflective displays with lateral dimensions that are tens of inches and include hundreds of millions to tens of billions of microfacets.

The large area master and tooling for manufacturing the microfacet-based reflective displays described herein may be implemented using, e.g., gray scale photolithography. Large area mastering and tooling can be accomplished with tiling of smaller subunits of a master to create a large area tooling that can be used to manufacture full-sized projection screens with the component optics, as described herein.

Figure 16:
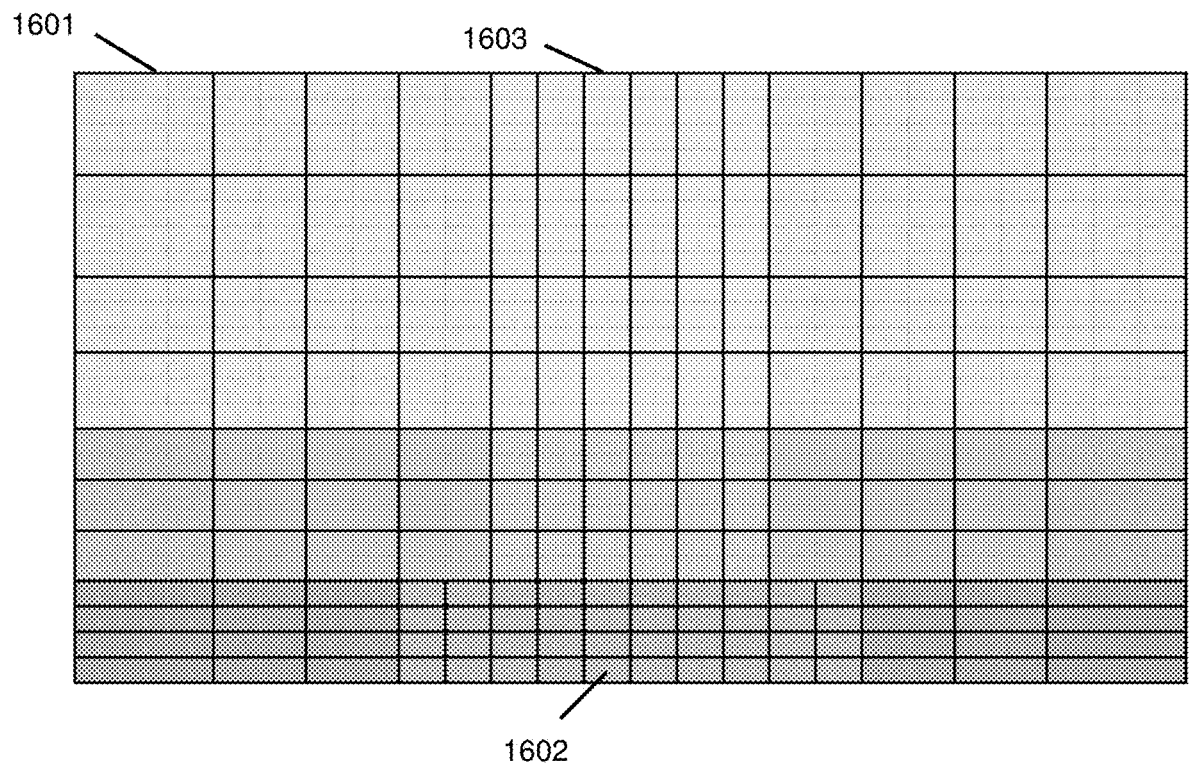
FIG. 16 illustrates a master template for manufacturing a microfacet-based reflective display, according to embodiments.

FIG. 16 schematically illustrates a master template for manufacturing a microfacet-based reflective display, according to embodiments. The illustrated master can be used to manufacture a microfacet-based reflective display with reduced cost, faster speed and enhanced adaptability for different sizes and configurations of microfacet-based reflective displays according to embodiments. The inventors have realized that there is a significant advantage of creating a master using smaller component units. The smallest component unit of a master that can be assembled into a master is referred to herein as a tile. A tile can have any suitable shape that can be close-packed to form a larger unit. While implementations are not so limited, different tiles can have the same dimensions and the same number of microfacets. In the illustrated master, the tiles have a rectangular shape and are arranged into 24 rows and 24 columns. In some implementations, different tiles of a master may have corresponding microfacets that have different orientations. However, in some other implementations, different tiles of a mater, e.g., some adjacent tiles, may have corresponding microfacets having the same microfacet orientations. Some tiles may be assembled into a larger unit referred to herein as sub-masters. In the illustrated embodiment, tiles bounded by thick lines are part of the same sub-master and have the same microfacet arrangements, while tiles separated by a thick line have different microfacet arrangements. For example, a sub-master 1601 includes a 3×4 array of identical tiles. In this case, the sub-master area can be created using only one tile at the lithographic mastering stage, saving significant cost and time. However, since it may be desirable for microfacet orientations to be different at different locations on the screen as described above, e.g., for improved uniformity, replication of a single tile to other locations on the screen can introduce some non-idealities or shifts/skews in the intensity distribution within the viewing window. The shifting/skewing can increase as a tile is re-used in locations further from the ideal location. In addition, for UST projector/screen geometries wherein the projector is located close to the bottom-middle of the microfacet-based reflective display, the magnitude of the shift/skew can be largest towards the bottom-middle of the screen and least toward the upper corners of the screen. Because of this, a non-uniform tile reuse scheme can be introduced, according to embodiments. As an example, in FIG. 16, unlike the sub-mater 1601, the bottom middle region of the screen uses adjacent tiles 1602 that are unique without replication to form sub-masters. On the other hand, upper middle region of the screen shows a sub-master 1603 including a 1×4 array of identical tiles.

Contrast-Enhanced Microfacet-Based Reflective Display

Figure 17:
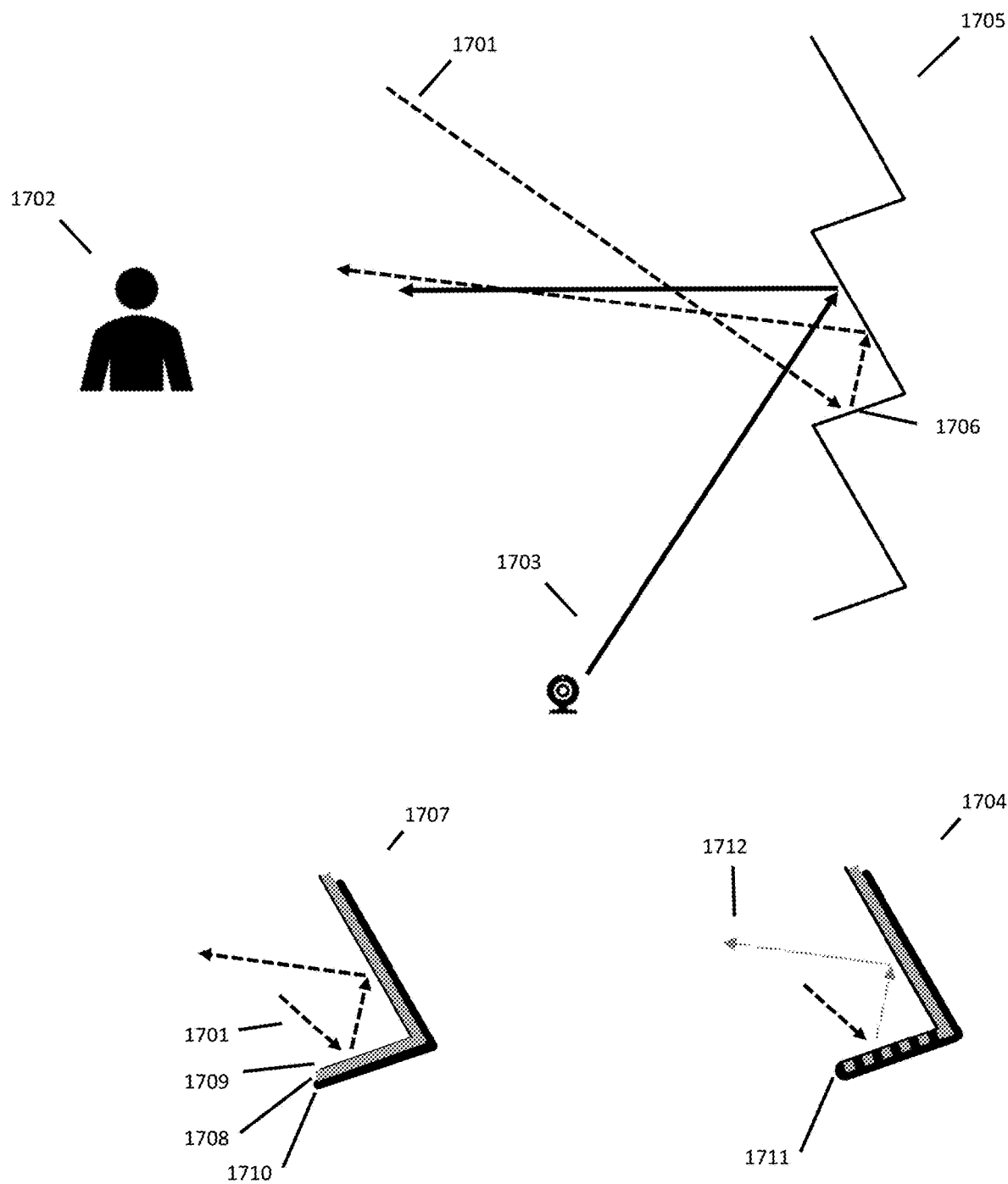
FIG. 17 illustrates a side view of a microfacet-based reflective display configured for enhanced contrast by reduction of ambient light reflection, according to embodiments.

FIG. 17 schematically illustrates a side view of a microfacet-based reflective display configured for enhanced contrast by reduction of ambient light reflection, according to embodiments. FIG. 17 (top) shows a side view of a microfacet-based reflective display 1705 similar to that shown above with respect to FIG. 5 for illustration of ambient light reflection and scattering paths. A viewing surface of the microfacet-based reflective display is configured such that adjacent ones of the microfacets are connected by connecting surfaces. The light path (solid line arrow) 1703 represents an example reflection path of light projected from a projector that is observed by a viewer 1702. On the other hand, the light path (dotted line arrow) 1701 represents an example reflection path of ambient light that can be observed by the viewer 1702, which can degrade the contrast of the observed image. Described herein are example microfacet arrangements that can enhance the contrast by reducing the amount of ambient light that is relayed to viewers. The side view of the microfacet-based reflective display 1705 shows a plurality of sawtooth shapes. Each sawtooth has a major surface that represents the microfacet surface for reflecting the incident light from the projector along the light path 1703. Each sawtooth also has a connecting surface 1706, also referred to herein as the "back of sawtooth" that can be primarily responsible for reflecting ambient light along the light path 1701 to the viewer 1702.

Still referring to FIG. 17 (bottom right/left), an example microfacet surface configured for ambient light reflection and enhanced contrast is illustrated. The illustrated example achieves contrast enhancement by reducing reflectivity of the connecting surfaces relative to major surfaces of the sawtooth shapes. By way of illustration, single sawtooth 1707 (bottom left), 1704 (bottom right) are illustrated. Referring to the sawtooth 1707, a multilayer structure configured for enhanced ambient light rejection is formed on the light incident surface. The multilayer structure includes a high absorbing layer 1710 and a reflective layer 1708 formed thereover. Referring to the sawtooth 1704, to enhance the contrast, the reflectivity of the connecting surface 1706 of the sawtooth may be lowered compared to the major surface of the sawtooth 1707. The reflectivity of the connecting surface 1706 may be lowered by several ways. For example, the connecting surface 1706 of the sawtooth may be covered with a material having lower reflectivity or higher absorbance relative to the major surface of the sawtooth. In the illustrated sawtooth 1704, a depleted reflective layer 1711 may be selectively formed on the connecting surface 1706. The depleted reflective layer 1711 can be formed, e.g., by a reduction in the amount or coverage of the reflective material relative to the reflective material formed on the major surface of the sawtooth 1704. As configured, the absorbing layer 1710 underlying the depleted reflective layer 1711 can more effectively absorb the incoming ambient light at the connecting surface, thereby suppressing the ambient light reflection and enhancing the contrast.

Figure 18:
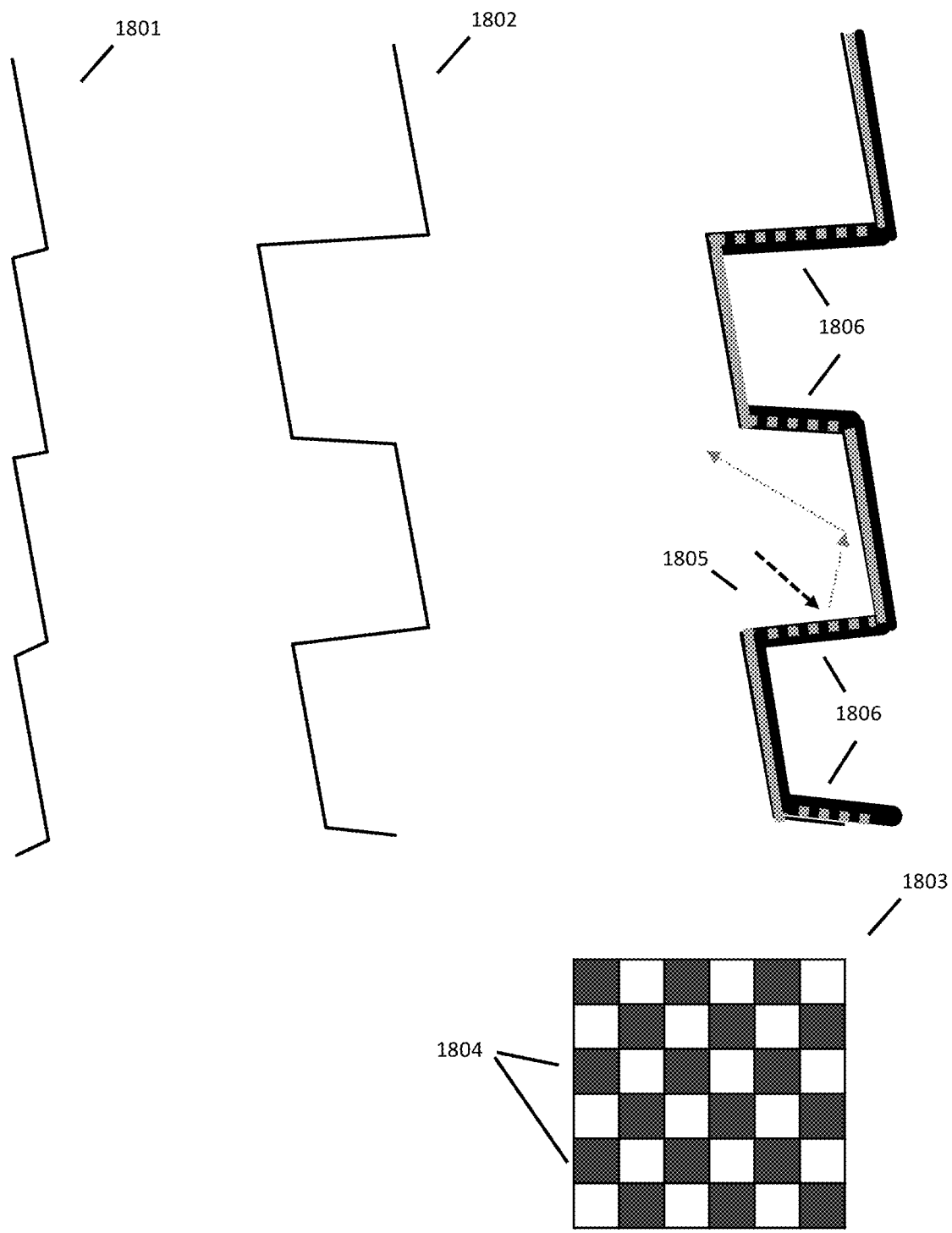
FIG. 18 illustrates a side view of a microfacet-based reflective display configured for enhanced contrast by reduction of ambient light reflection, according to embodiments.

FIG. 18 schematically illustrates a side view of a microfacet-based reflective display configured for enhanced contrast by ambient light reduction, according to embodiments. The contrast enhancement approach illustrated in FIG. 18 expands on the methodology employed in FIG. 17 by increasing the overall area of surfaces that absorb the incident ambient light. The microfacet-based reflective displays descried above with respect to FIG. 17, which have a sawtooth profile in side-view, can have relatively small connecting surfaces or "back of sawtooth" surfaces, as illustrated in the side view profile 1801 of a microfacet-based reflective display. In such configuration, the surface area of the connecting surfaces of the sawtooth shapes can limit the amount of absorbing layer that can be present to reduce the ambient reflections. In recognition of this possible limitation, FIG. 18 illustrates a side view profile 1802 of a microfacet-based reflective display according to embodiments, which has a different microfacet design with increased step height 1806 between major microfacet surfaces, to increase the surface area that is available for absorbing the ambient light. In this embodiment, adjacent major surfaces of microfacets for reflecting light from a projector are connected by larger step heights 1806. The resulting topology substantially increases the surface area available for absorption of ambient light. The contrast-enhanced microfacet-based reflective display 1805 illustrates the resulting surfaces including the increased surface area on which a depleted reflective layer can be formed, as illustrated. Whereas the side view profiles 1801 and 1802 represent 2-D transverse cross-sectional profile of a 3-D microfacet structure, a top down profile 1803 represents a top-down sagittal 2-D view of the microfacet-based reflective display, in which dark regions 1804 indicating the reduced ambient light perceived by the viewer as increased contrast. These areas of increased contrast are achieved by the same selective reflective layer depletion and subsequent absorbing layer application strategy as described herein, but the surfaces that have a thin reflective layer with absorbing layer for ambient light reduction are the "forced steps" indicated by the step heights 1806.

According to various embodiments, the microfacet-based reflective displays according to embodiments have an average gain ratio within the viewing window greater than 1.0, 1.2, 1.4, 1.6, 1.8, 2.0, 2.2, 2.4, 2.6, 2.8, 3.0, 3.2, 3.4, 3.6, 3.8, 4.0, or a value in a range defined by any of these values.

Computer Systems for Microfacet-Based Reflective Display Systems

Another aspect of the present disclosure provides a system that is programmed or otherwise configured to display images using various reflective displays disclosed herein. The system can include a computer server that is operatively coupled to a projector and a photo detector. The projector and photo detector can be standalone units or integrated as a projection and detection system.

Figure 19:
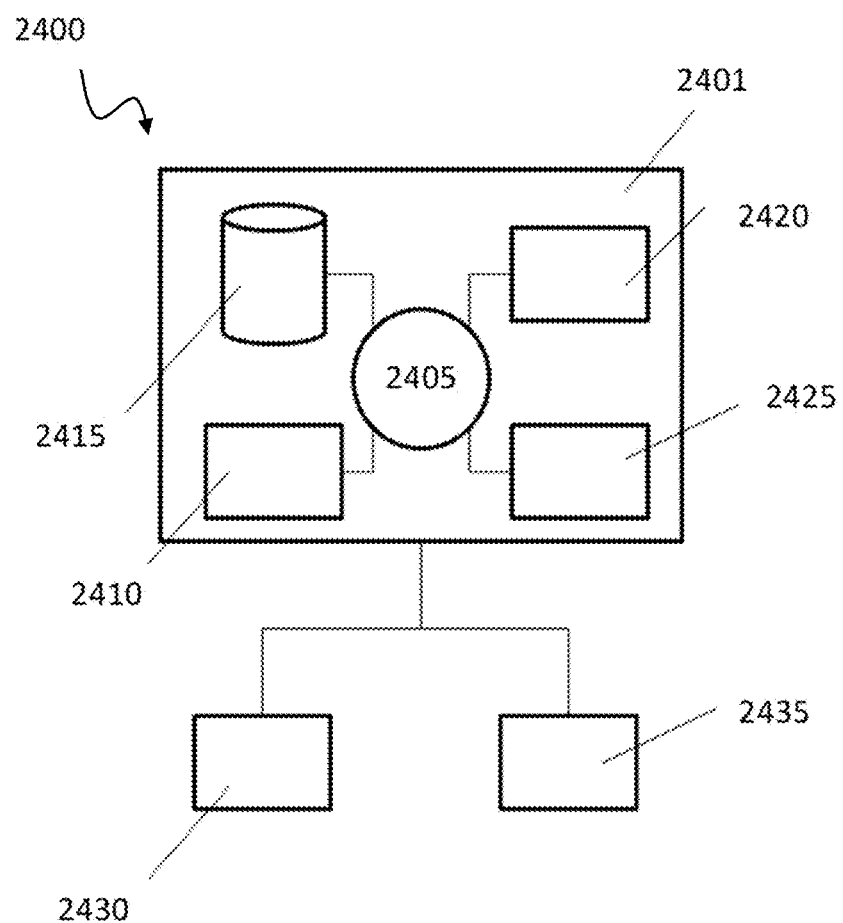
FIG. 19 illustrates a computer system programmed or integrated with a microfacet-based reflective displays according to embodiments.

FIG. 19 illustrates a computer system programmed or integrated with a microfacet-based reflective displays according to embodiments. The computer system 2400 comprises a computer server ("server") 2401 that is programmed to implement methods disclosed herein. The server 2401 includes a central processing unit (CPU, also "processor" and "computer processor" herein) 2405, which can be a single core or multi core processor, or a plurality of processors for parallel processing. The server 2401 also includes memory 2410 (e.g., random-access memory, read-only memory, flash memory), electronic storage unit 2415 (e.g., hard disk), communication interface 2420 (e.g., network adapter) for communicating with one or more other systems, and peripheral devices 2425, such as cache, other memory, data storage and/or electronic display adapters. The memory 2410, storage unit 2415, interface 2420 and peripheral devices 2425 are in communication with the CPU 2405 through a communication bus (solid lines), such as a motherboard. The storage unit 2415 can be a data storage unit (or data repository) for storing data. The server 2401 can be operatively coupled to a computer network ("network") with the aid of the communication interface 2420. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the server 2401, can implement a peer-to-peer network, which may enable devices coupled to the server 2401 to behave as a client or a server.

The storage unit 2415 can store files or data. The server 2401 can include one or more additional data storage units that are external to the server 2401, such as located on a remote server that is in communication with the server 2401 through an intranet or the Internet.

In some situations, the system 2400 includes a single server 2401. In other situations, the system 2400 includes multiple servers in communication with one another through an intranet and/or the Internet.

The server 2401 can be adapted to store user information and data of or related to a projection environment, such as, for example, display angles and intensity settings. The server 2401 can be programmed to display an image or video through a projector coupled to the server 2401.

Methods as described herein can be implemented by way of machine (or computer processor) executable code (or software) stored on an electronic storage location of the server 2401, such as, for example, on the memory 2410 or electronic storage unit 2415. During use, the code can be executed by the processor 2405. In some cases, the code can be retrieved from the storage unit 2415 and stored on the memory 2410 for ready access by the processor 2405. In some situations, the electronic storage unit 2415 can be precluded, and machine-executable instructions are stored on memory 2410.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The server 2401 is coupled to (e.g., in communication with) a projector 2430 and a photo detector 2435. In an example, the projector 2430 can project an image or video onto a retro-reflective screen. In another example, the projector 2430 can project ultraviolet or infrared light onto the retro-reflective screen. The photo detector 2435 can detect (or measure) reflected light from the retro-reflective screen.

The projector 2430 can include one or more optics for directing and/or focusing an image or video onto the retro-reflective screen. The photo detector can be a device that is configured to generate an electrical current upon exposure to light, such as, for example, a charge-coupled device (CCD). Projectors can include, for example and without limitation, film projectors, cathode ray tube (CRT) projectors, laser projectors, Digital Light Processor (DLP) or Digital Micromirror Device (DMD) projectors, liquid crystal display (LCD) projectors, or liquid crystal on silicon (LCOS) projectors.

Aspects of the systems and methods provided herein, such as the server 2401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. An algorithm can be implemented by way of software upon execution by the central processing unit 2405.

Additional Examples:

1. A reflective display comprising a plurality of light-reflective microfacets formed on a major surface thereof and configured to display an image by collectively reflecting light incident thereon from a light source, wherein light rays reflected by different ones of the microfacets are directed in different non-parallel directions.

2. A reflective display comprising a plurality of light-reflective microfacets formed on a major surface thereof and configured to display an image by collectively reflecting light incident thereon from a light source, wherein the microfacets have a distribution of microfacet orientations such that an intensity profile of light crossing a viewing window in one or both of a horizontal direction and a vertical direction is substantially non-Gaussian, the viewing window defining an area in a viewing plane parallel to the major surface at a viewing distance therefrom.

3. A reflective display comprising a plurality of light-reflective microfacets formed on a major surface thereof and configured to display an image by collectively reflecting light incident thereon from a light source, wherein light rays reflected by the microfacets collectively diverge from the major surface to form the image within a viewing window having a size greater than that of the reflective display, the viewing window defining an area in a viewing plane parallel to the major surface at a viewing distance therefrom, wherein outside of the viewing window, an intensity of the displayed image falls by more than 30% relative to a peak intensity within the viewing window.

4. A reflective display comprising a major surface having formed thereon a plurality of light-reflective microfacets configured to display an image by collectively reflecting light incident thereon from a light source, wherein the light-reflective microfacets are arranged to form a plurality of screen pixels, wherein different ones of the microfacets within at least some of the screen pixels are configured to reflect light rays to cross different and unique ones of non-overlapping regions of a viewing window, the viewing window defining an area in a viewing plane parallel to the major surface at a viewing distance therefrom, wherein outside of the viewing window, an intensity of the displayed image falls by more than 30% relative to a peak intensity within the viewing window.

5. A reflective display comprising a major surface having formed thereon a plurality of light-reflective microfacets configured to display an image by collectively reflecting light incident thereon from a light source, wherein the light-reflective microfacets are arranged to form a plurality of screen pixels, wherein different ones of the microfacets within at least some of the screen pixels are configured to reflect light rays to cross randomly assigned ones of the non-overlapping regions of a viewing window, the viewing window defining an area in a viewing plane parallel to the major surface at a viewing distance therefrom, wherein outside of the viewing window, an intensity of the displayed image falls by more than 30% relative to a peak intensity within the viewing window.

6. A reflective display comprising a major surface having formed thereon a plurality of light-reflective microfacets configured to display an image by collectively reflecting light incident thereon from a light source, wherein the light-reflective microfacets are arranged to form a plurality of screen pixels, wherein light rays reflected by at least some of the microfacets of at least some of the screen pixels crossing a viewing window are distributed to span at least 50% of the viewing window, the viewing window defining an area in a viewing plane parallel to a major surface of the reflective display at a viewing distance therefrom, wherein outside of the viewing window, an intensity of the displayed image falls by more than 30% relative to a peak intensity within the viewing window.

7. A reflective display comprising a plurality of light-reflective microfacets formed on a major surface thereof and configured to display an image by collectively reflecting light incident thereon from a light source, wherein the microfacets have a distribution of microfacet orientations such that an intensity profile of light crossing a viewing window in one or both of a horizontal direction and a vertical direction is substantially non-Gaussian, the viewing window defining an area in a viewing plane parallel to the major surface at a viewing distance therefrom.

8. A reflective display comprising a major surface having formed thereon a plurality of light-reflective microfacets configured to display an image by collectively reflecting light incident thereon from a light source, wherein the light-reflective microfacets are arranged to form a plurality of screen pixels, wherein light rays reflected from different screen pixels cross overlapping areas within a viewing window, wherein the viewing window defines an area in a viewing plane parallel to a major surface of the reflective display at a viewing distance therefrom.

9. The reflective display of any of the above Embodiments, wherein contiguous ones of the microfacets within at least some pixels have microfacet angles that do not vary monotonically in a lateral direction, wherein a microfacet angle is formed by a general surface normal of the major surface of the reflective display and a local surface normal of a respective one of the microfacets.

10. The reflective display of any of the above Embodiments, wherein the reflective display is configured such that the light from the light source is directly incident on the microfacets, and the light reflected by the microfacets directly reach the viewing window.

11. The reflective display of any of the above Embodiments, wherein the light-reflective microfacets form an uppermost surface of the reflective display.

12. The reflective display of any of the above Embodiments, wherein the light-reflective microfacets are formed on a transparent material.

13. The reflective display of any of the above Embodiments, wherein the light-reflective microfacets are formed on a transparent material, and wherein the transparent material forms an uppermost planar surface configured to face the light source.

14. The reflective display of any of the above Embodiments, wherein the light-reflective microfacets are formed on a transparent material, and wherein the transparent material has an index of refraction of 1.2-1.8.

15. The reflective display of any of the above Embodiments, wherein a transparent coating is formed on the light-reflective microfacets, and wherein the transparent material is such that an angle of incidence of a light ray on a location of the transparent material is greater than an angle of incidence of the light ray incident on one of the microfacets corresponding to the location.

16. The reflective display of any of the above Embodiments, wherein at least some of the microfacets within at least some of the screen pixels reflect light rays to cross a unique one of the non-overlapping regions of the viewing window.

17. The reflective display of any of the above Embodiments, wherein at least some of the microfacets within at least some of the screen pixels reflect light rays to cross randomly assigned ones of the non-overlapping regions of the viewing window.

18. The reflective display of any of the above Embodiments, wherein at least some of the microfacets within at least some of the screen pixels reflect light rays to cross randomly assigned but different ones of the non-overlapping regions of the viewing window.

19. The reflective display of any of the above Embodiments, wherein at least some of the microfacets within at least some of the screen pixels reflect light rays to cross non-overlapping regions of the viewing window having equal areas.

20. The reflective display of any of the above Embodiments, wherein at least some of the microfacets within at least some of the screen pixels reflect light rays to cross non-overlapping regions of the viewing window having different areas.

21. The reflective display of any of the above Embodiments, wherein at least some of the microfacets within at least some of the screen pixels reflect light rays to cross non-overlapping regions of the viewing window having different areas, wherein non-overlapping areas disposed farther away from the at least some of the microfacets have larger areas relative to non-overlapping areas close to the at least some of the microfacets.

22. The reflective display of any of the above Embodiments, wherein each screen pixel has the same number of microfacets as the number of non-overlapping regions of the viewing window.

23. The reflective display of any of the above Embodiments, wherein at least a pair of screen pixels have corresponding pairs of microfacets having corresponding row and column combinations within the array, wherein light rays from the corresponding pairs of microfacets cross the same ones of the non-overlapping regions.

24. The reflective display of any of the above Embodiments, wherein at least a pair of screen pixels have corresponding microfacets having corresponding row and column combinations within the array, wherein light rays from the corresponding pairs of microfacets cross different ones of the non-overlapping regions.

25. The reflective display of any of the above Embodiments, wherein at least a pair of screen pixels have non-corresponding microfacets having non-corresponding row and column combinations within the array, wherein light rays from non-corresponding microfacets cross the same ones of the non-overlapping regions.

26. The reflective display of any of the above Embodiments, wherein the reflective display is configured to display the image with the light source disposed closer to the reflective display than a viewer at the viewing distance.

27. The reflective display of any of the above Embodiments, wherein the reflective display is a short throw (ST) or ultra-short throw (UST) reflective display having a width extending in a first lateral direction and is configured to be at a distance from the light source in a second lateral direction perpendicular to the first lateral direction, such that a throw ratio is less than 1.0.

28. The reflective display of any of the above Embodiments, wherein the reflective display is a ST reflective display having a width extending in a first lateral direction and is configured to be at a distance from the light source in a second lateral direction perpendicular to the first lateral direction, such that a throw ratio is between than 0.4 and 1.0.

29. The reflective display of any of the above Embodiments, wherein the reflective display is a UST reflective display having a width extending in a first lateral direction and is configured to be at a distance from the light source in a second lateral direction perpendicular to the first lateral direction, such that a throw ratio is between than 0.1 and 0.4.

30. The reflective display of any of the above Embodiments, wherein the reflective display has a width extending in a horizontal direction exceeding 1 meter.

31. The reflective display of any of the above Embodiments, wherein the reflective display has a height extending in a vertical distance exceeding about 0.5 meter.

32. The reflective display of any of the above Embodiments, wherein the viewing window is disposed at the viewing distance exceeding 1 meter.

33. The reflective display of any of the above Embodiments, wherein the reflective display is configured to display the image by reflecting the light from the light source incident thereon at an angle of incidence greater than 40 degrees relative to a surface normal to the major surface of the reflective display.

34. The reflective display of any of the above Embodiments, wherein the reflective display is configured to reflect the light from the light source disposed vertically below the reflective display relative to a lower edge of the reflective display.

35. The reflective display of any of the above Embodiments, wherein the reflective display is configured to reflect the light from the light source disposed horizontally to the left of the left edge of the reflective display or to the right of the right edge of the reflective display when the reflective display is viewed from a viewer facing the reflective display along a normal direction crossing a central location of the reflective display.

36. The reflective display of any of the above Embodiments, wherein reflective display includes at least 10 million light-reflective microfacets.

37. The reflective display of any of the above Embodiments, wherein the microfacets are arranged as an array including a plurality or rows of microfacets and a plurality columns of microfacets.

38. The reflective display of any of the above Embodiments, wherein the microfacets have a rectangular shape.

39. The reflective display of any of the above Embodiments, wherein individual ones of the microfacets have the longest lateral dimension that is less than 1 mm.

40. The reflective display of any of the above Embodiments, wherein the plurality of microfacets has a distribution of microfacet orientations such that the reflective display is configured to display an image within a viewing window having a width greater than 1 meter, wherein the viewing window defines an area in a viewing plane parallel to the reflective display at a viewing distance exceeding 1 meter from a major surface of the reflective display, wherein outside of the viewing window, an intensity of the displayed image falls by more than 30% relative to a peak intensity within the viewing window.

41. The reflective display of any of the above Embodiments, wherein the plurality of microfacets has a distribution of microfacet orientations such that the reflective display is configured to display an image within a viewing window having a height greater than 0.5 meter, wherein the viewing window defines an area in a viewing plane parallel to the reflective display at a viewing distance exceeding 1 meter from a major surface of the reflective display, wherein outside of the viewing window, an intensity of the displayed image falls by more than 30% relative to a peak intensity within the viewing window.

42. The reflective display of any of the above Embodiments, wherein the plurality of microfacets has a distribution of microfacet orientations such that the reflective display is configured to display an image within a viewing window having a width defined by a horizontal angle formed in a horizontal plane crossing the reflective display and spanning at least +/−10 degrees relative to a surface normal at a central location of the reflective display, wherein the viewing window defines an area in a viewing plane parallel to the reflective display at a viewing distance exceeding 1 meter from a major surface of the reflective display, wherein outside of the viewing window, an intensity of the displayed image falls by more than 30% relative to a peak intensity within the viewing window.

43. The reflective display of any of the above Embodiments, wherein the plurality of microfacets has a distribution of microfacet orientations such that the reflective display is configured to display an image within a viewing window having a height defined by a vertical angle formed in a vertical plane crossing the reflective display and spanning at least +/−1 degrees relative to a surface normal at a central location of the reflective display, wherein the viewing window defines an area in a viewing plane parallel to the reflective display at a viewing distance exceeding 1 meter from a major surface of the reflective display, wherein outside of the viewing window, an intensity of the displayed image falls by more than 30% relative to a peak intensity within the viewing window.

44. The reflective display of any of the above Embodiments, wherein the plurality of microfacets has a distribution of microfacet orientations such that an intensity profile of reflected light across the viewing window in a horizontal or a vertical direction varies by less than 30%, relative to an average intensity within the viewing window.

45. The reflective display of any of the above Embodiments, wherein the plurality of microfacets has a distribution of microfacet orientations such that an intensity profile of reflected light across the viewing window in one or both of a horizontal direction and a vertical direction is substantially non-Gaussian.

46. The reflective display of any of the above Embodiments, wherein the intensity profile of light crossing the viewing window is elongated in the horizontal direction relative to the vertical direction.

47. The reflective display of any of the above Embodiments, wherein at least a subset of the plurality of microfacets are oriented such that a light ray reflected from each microfacet of the subset crosses a corresponding unique location within the viewing window.

48. The reflected display of any of the above Embodiments, wherein at least a subset of the plurality of microfacets are oriented such that a light ray reflected from each microfacet of the subset crosses a randomly selected location within the viewing window.

49. The reflective display of any of the above Embodiments, wherein the plurality of microfacets are arranged into a plurality of light-reflective blocks each comprising an equal number of microfacets, wherein each light-reflective block has at least one microfacet having a different microfacet angle compared to corresponding microfacets of the others of the light reflective blocks, wherein a microfacet angle is formed by a general normal of a major surface of the reflective display and a local normal of a respective microfacet.

50. The reflective display of any of the above Embodiments, wherein the plurality of microfacets are arranged into a plurality of light-reflective blocks each comprising one or more of screen pixels.

51. The reflective display of any of the above Embodiments, wherein the plurality of microfacets are arranged into a plurality of light-reflective blocks each comprising an equal number of microfacets, wherein different light-reflective blocks have different average microfacet angles formed by a general normal direction of a major surface of the reflective display and local normal directions of respective microfacets within respective blocks.

52. The reflective display of any of the above Embodiments, wherein the plurality of microfacets are arranged into a plurality of light-reflective blocks each comprising an array of microfacets having at least two rows and two columns, wherein different light-reflective blocks have different average microfacet angles formed by a general normal direction of a major surface of the reflective display and local normal directions of respective microfacets within respective blocks.

53. The reflective display of any of the above Embodiments, wherein each of the light-reflective blocks is configured such that light reflected by the respective light-reflective blocks covers a respective sub-viewing window, wherein outside of the viewing window, an intensity of the reflected light falls by more than 30% relative to a peak intensity within the sub-viewing window.

54. The reflective display of any of the above Embodiments, wherein different ones of the light-reflective blocks are configured such that light reflected by the different ones of the light-reflective blocks cover different sub-viewing windows, wherein at least one sub-viewing window overlaps with another sub-viewing window.

55. The reflective display of any of the above Embodiments, wherein different ones of the light-reflective blocks are configured such that light reflected by the different ones of the light-reflective blocks cover different sub-viewing windows, wherein at least one sub-viewing windows overlaps with another sub-viewing window.

56. The reflective display of any of the above Embodiments, wherein at least a pair of light-reflective blocks is configured such that each corresponding pair of microfacets of the pair of light-reflective blocks is configured to reflect light from the light source towards same location within the viewing window.

57. The reflective display of any of the above Embodiments, wherein at least a pair of adjacent light-reflective blocks is configured such that each corresponding pair of microfacets of the pair of adjacent light-reflective blocks is configured to reflect light from the light source towards a same location within the viewing window.

58. The reflective display of any of the above Embodiments, wherein at least a pair of light-reflective blocks is configured such that each corresponding pair of microfacets of the pair of light-reflective blocks is configured to reflect light from the light source towards different locations within the viewing window.

59. The reflective display of any of the above Embodiments, wherein at least a pair of adjacent light-reflective blocks is configured such that each corresponding pair of microfacets of the pair of adjacent light-reflective blocks is configured to reflect light from the light source towards different locations within the viewing window.

60. The reflective display of any of the above Embodiments, wherein at least a pair of light-reflective blocks is configured such that a non-corresponding pair of microfacets of the pair of light-reflective blocks is configured to reflect light from the light source towards same location within the viewing window.

61. The reflective display of any of the above Embodiments, wherein at least a pair of adjacent light-reflective blocks is configured such that a non-corresponding pair of microfacets of the pair of adjacent light-reflective blocks is configured to reflect light from the light source towards a same location within the viewing window.

62. The reflective display of any of the above Embodiments, wherein different ones of the light-reflective blocks are configured such that light reflected by a the different ones of the light-reflective blocks cover different sub-viewing windows, wherein at least one sub-viewing window corresponding to light reflected from a light-reflective block closer to the light source has a larger sub-viewing window compared to light reflected from a light-reflective block further away from the light source.

63. The reflective display of any of the above Embodiments, wherein a viewing surface of the reflective display is configured such that adjacent ones of the microfacets are connected by connecting surfaces, wherein the connecting surfaces have a higher absorbance relative to the microfacets.

64. The reflective display of any of the above Embodiments, wherein a viewing surface of the reflective display is configured such that adjacent ones of the microfacets are connected by connecting surfaces, wherein in a cross-sectional view, the microfacets and the connecting surfaces form opposing surfaces of sawtooth shapes.

65. The reflective display of any of the above Embodiments, wherein a viewing surface of the reflective display is configured such that adjacent ones of the microfacets are connected by connecting surfaces, wherein in a cross-sectional view, the microfacets and the connecting surfaces form protrusions alternating with recesses, wherein top surfaces of protrusions and bottom surfaces of recesses facing a viewing position form the microfacets and sidewalls of the protrusion and the recesses form the connecting surfaces.

66. The reflective display of any of the above Embodiments, wherein the reflective display has an average gain ratio greater than 1.4 within the viewing window.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

What is claimed is:

1. A reflective display comprising:
a plurality of light-reflective microfacets formed on a major surface thereof and configured to display an image by reflecting light incident thereon from a light source,
wherein light rays reflected by different ones of the microfacets are directed in non-parallel directions,
wherein the microfacets are arranged to form a plurality of pixels,
wherein different ones of the microfacets within at least some of the pixels are configured to reflect light rays to cross unique ones of non-overlapping regions of a viewing window, the viewing window defining an area in a viewing plane parallel to the major surface at a viewing distance therefrom, and
wherein outside of the viewing window, an intensity of a displayed image falls by more than 30% relative to a peak intensity of the displayed image within the viewing window.

2. The reflective display of claim 1, wherein each of the pixels includes more than two microfacets, wherein the pixels define a resolution of the reflective display.

3. The reflective display of claim 2, wherein contiguous ones of the microfacets within at least some of the pixels have microfacet angles that do not vary monotonically in a lateral direction, wherein a microfacet angle is formed by a general surface normal of the major surface of the reflective display and a local surface normal of a respective one of the microfacets.

4. The reflective display of claim 1, wherein the reflective display has one or both of a width extending in a horizontal direction exceeding 1 meter and a height extending in a vertical distance exceeding 0.5 meter.

5. The reflective display of claim 4, wherein the viewing distance exceeds 1 meter, wherein the light rays reflected by the different ones of the microfacets collectively diverge from the major surface to form the image within the viewing window having a size greater than that of the reflective display.

6. The reflective display of claim 1, wherein each of the pixels has the same number of microfacets as the number of non-overlapping regions of the viewing window.

7. The reflective display of claim 1, wherein the microfacets form an uppermost surface of the reflective display configured to face the light source.

8. The reflective display of claim 1, wherein the light-reflective microfacets are formed on a backside of a sheet of a transparent material, the backside configured to face away from the light source.

9. The reflective display of claim 8, wherein the sheet of the transparent material forms a planar front surface configured to face the light source.

10. The reflective display of claim 9, wherein the transparent material has an index of refraction of 1.2-1.8.

11. The reflective display of claim 10, wherein an angle of incidence of a light ray incident on a location on the sheet of the transparent material is greater than an angle of incidence of the light ray incident on a microfacet corresponding to the location after passing through the sheet of the transparent material.

12. The reflective display of claim 1, wherein the reflective display is a short throw (ST) or ultra-short throw (UST) reflective display having a width extending in a first lateral direction and is configured to be at a distance from the light source in a second lateral direction perpendicular to the first lateral direction, such that a throw ratio between the distance and the width that is less than 1.0.

13. The reflective display of claim 1, wherein the reflective display is configured to display the image by reflecting the light from the light source incident thereon at an angle of incidence greater than 30 degrees relative to a surface normal to the major surface of the reflective display.

14. A reflective display comprising:
a plurality of light-reflective microfacets formed on a major surface thereof and configured to display an image by reflecting light incident thereon from a light source,
wherein the microfacets have a distribution of microfacet orientations such that an intensity profile of light crossing a viewing window in one or both of a horizontal direction and a vertical direction is substantially non-Gaussian, the viewing window defining an area in a viewing plane parallel to the major surface at a viewing distance therefrom,
wherein the microfacets are arranged to form a plurality of pixels,
wherein different ones of the microfacets within at least some of the pixels are configured to reflect light rays to cross unique ones of non-overlapping regions of the viewing window, and
wherein the viewing window is such that outside of the viewing window, an intensity of a displayed image falls by more than 30% relative to a peak intensity of the displayed image within the viewing window.

15. The reflective display of claim 14, each of the pixels includes more than two microfacets, wherein the pixels define a resolution of the reflective display.

16. The reflective display of claim 15, wherein the intensity profile of light crossing the viewing window is elongated in the horizontal direction relative to the vertical direction.

17. The reflective display of claim 15, wherein the viewing distance exceeds 1 meter, wherein the light rays reflected by the different ones of the microfacets collectively diverge from the major surface to form the image within the viewing window having a size greater than that of the reflective display.

18. The reflective display of claim 15, wherein at least some of the microfacets within at least some of the pixels are configured to reflect light rays to cross non-overlapping regions of the viewing window having equal areas.

19. The reflective display of claim 15, wherein at least some of the microfacets within at least some of the pixels are configured to reflect light rays to cross non-overlapping regions of the viewing window having different areas, wherein non-overlapping areas disposed farther away from the at least some of the microfacets have larger areas relative to non-overlapping areas closer to the at least some of the microfacets.

20. A reflective display comprising:
- a major surface having formed thereon a plurality of light-reflective microfacets configured to display an image by reflecting light incident thereon from a light source,
- wherein the microfacets are arranged to form a plurality of pixels,
- wherein different ones of the microfacets within at least some of the pixels are configured to reflect light rays to cross unique ones of non-overlapping regions of a viewing window, the viewing window defining an area in a viewing plane parallel to the major surface at a viewing distance therefrom,
- wherein outside of the viewing window, an intensity of a displayed image falls by more than 30% relative to a peak intensity of the displayed image within the viewing window.

21. The reflective display of claim 20, wherein light rays reflected by at least some of the microfacets of at least some of the pixels crossing the viewing window are distributed to span at least 50% of the viewing window.

22. The reflective display of claim 20 wherein light rays reflected by at least some of the microfacets of at least some of the pixels cross randomly selected ones of the non-overlapping regions within the viewing window.

23. The reflective display of claim 20, wherein each of the pixels has the same number of microfacets as the number of the non-overlapping regions of the viewing window.

24. The reflective display of claim 23, wherein each of the pixels comprises an array of microfacets having at least two rows and two columns.

25. The reflective display of claim 24, wherein at least a pair of the pixels have corresponding microfacets having corresponding row and column combinations within respective arrays, wherein light rays from the corresponding microfacets cross the same ones of the non-overlapping regions.

26. The reflective display of claim 24, wherein at least a pair of the pixels have corresponding microfacets having corresponding row and column combinations within respective arrays, wherein light rays from the corresponding microfacets cross different ones of the non-overlapping regions.

27. The reflective display of claim 24, wherein at least a pair of the pixels have non-corresponding microfacets having non-corresponding row and column combinations within respective arrays, wherein light rays from non-corresponding microfacets cross the same ones of the non-overlapping regions.

* * * * *